United States Patent
Tan et al.

(10) Patent No.: US 6,263,255 B1
(45) Date of Patent: Jul. 17, 2001

(54) ADVANCED PROCESS CONTROL FOR SEMICONDUCTOR MANUFACTURING

(75) Inventors: Heng-Wei Osbert Tan; Donald H. Vines, Jr., both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/080,620

(22) Filed: May 18, 1998

(51) Int. Cl.[7] .................................................. G06F 19/00
(52) U.S. Cl. ........................ 700/121; 700/48; 700/95; 700/106; 700/115; 700/116; 709/223; 709/303; 709/304; 705/14; 705/15; 705/27; 705/28
(58) Field of Search .................................. 700/48, 49, 95, 700/96, 97, 106, 115, 116, 121; 709/223–226, 300, 303, 304; 705/14, 15, 27, 20, 8

(56) References Cited

U.S. PATENT DOCUMENTS

| | | | |
|---|---|---|---|
| 4,552,718 | * | 11/1985 | Impink, Jr. et al. ................. 376/216 |
| 5,859,964 | * | 1/1999 | Wang et al. ............................ 714/48 |
| 5,896,294 | * | 4/1999 | Chow et al. .......................... 700/121 |
| 6,038,540 | * | 3/1999 | Krist et al. ............................... 705/8 |
| 6,038,545 | * | 3/1999 | Mandeberg et al. .................. 705/15 |

* cited by examiner

Primary Examiner—William Grant
Assistant Examiner—Ramesh Patel
(74) Attorney, Agent, or Firm—Skjerven Morrill MacPherson LLP; Ken J. Koestner

(57) ABSTRACT

An Advanced Process Control (APC) Framework performs automatic process control operations through the design and development of a software framework that integrates factory, process, and equipment control systems. The APC Framework benefits semiconductor-manufacturing factories, or "fabs," throughout the development of the APC Framework by using an iterative development approach. The APC Framework is designed to integrate seamlessly with commercially-available APC tools. The APC Framework specifies components and a component structure that enable multiple vendors to build and sell framework-compatible products using an open architecture that accommodates plug-and-play components. The APC Framework advantageously increases product yield distributions and equipment utilization, and lowers defect densities.

37 Claims, 22 Drawing Sheets

ADVANCED PROCESS CONTROL FOR SEMICONDUCTOR MANUFACTURING

BACKGROUND OF THE INVENTION

1. Field of the Invention

The present invention relates to process control systems including computer-based materials management. More precisely, the present invention relates to a feed forward process control system used in semiconductor fabrication based on material groupings.

2. Description of the Related Art

In the past, semiconductor manufacturing process control was largely achieved by ensuring that process parameters were set on a machine controller according to machine-dependent recipes. The basic philosophy of conventional semiconductor manufacturing process control is that if all settings that affect the process are set correctly, the machine will consistently produce a specified product. Using the conventional approach, manufacturing personnel act to relate machine settings to product characteristics. The approach has yet to be fully realized, however, due to a number of factors, including variability in equipment performance, variability in incoming materials such as wafers and chemicals, increasingly complex processes, and a lack of adequate models relating process settings to product characteristics. Success using the conventional process control approach becomes much less likely as the size of wafer features becomes smaller.

Engineers have derived recipe settings based largely on experience, intuition, and, more recently, Response Surface Methodology (RSM) experiments. Initially, the recipes were manually downloaded to the equipment by operators/technicians. Subsequently, Factory Control Systems incorporating Equipment Integration (EI) functionality provided automated recipe management and download operations.

Most recently, engineers have used Statistical Process Controls (SPC) concepts and methods for monitoring the performance of processes to verify that a process remains in a state of "statistical control." Initially, operators and technicians performed SPC manually. Subsequently, all-manual charting was replaced with computerized factory control systems (FCS)-based SPC charts. In some cases automated Trouble Shooting Guides (TSGs) supplied automation to process control tasks. SPC is a fault detection methodology. TSGs perform rule-based classification and assist with problem resolution. SPC helps distinguish between two types of process variation: common and special. SPC out-of-control signals are clues that are useful for identifying sources of special variation. Once a cause for special variation is determined, manufacturing can produce improvements in the process and product quality. As a fault detection and classification methodology, SPC relies upon an intimate understanding of the process and is largely manual and reactive. FIG. 1 is a schematic block diagram that shows a traditional SPC process.

The conventional process control approaches have resulted in substantial progress. However, reactive process control techniques such as SPC do not achieve and sustain desired product yields and resource productivity, particularly in light of the size and speed specifications of future products. The semiconductor industry must continue to develop and deploy new process control methods. To address significant unresolved problems, an Advanced Process Control (APC) Framework is needed with the ability to provide:

(1) Sensor-based automated fault detection to provide in real time the equipment or process conditions that result in a misprocessed wafer.

(2) Classification of detected faults to determine the cause of a fault and expedite repair of a tool.

(3) Model-based run-to-run process control using sensor inputs, process models, and process control strategies to ensure that the process remains optimal for every die on every wafer.

(4) Model-based real-time process control using in situ inputs, process models, and process control strategies to correctly process control parameters during the process run, ensuring that product characteristics are achieved.

Common Object Request Broker Architecture (CORBA) based technologies are used as a communication interface between clients and servers, often in highly complex systems. Due to the complex nature of the systems, testing can be difficult. The system complexity arises because multiple components interact with one another over a network, which introduces problems. Many components operate both as a client and as a server since, in servicing a request, a component calls other remote services which, in turn, call other remote services. Testing of a client-server component is difficult since the component uses a driver to send requests and to send harnesses to emulate other components that interact with the client-server component. Also failures and performance problems may occur in any of multiple potentially remote components and therefore be difficult to isolate.

The problems and complexities of these technologies including complexities arising from the integration of multiple components, the verification of the correct operation of all of the multiple components individually and while interacting, and the analysis not only of correct operation but also of performance place a high demand on system test personnel. No longer can the least experienced developers perform the testing. More experienced architects are needed to specify and set up a testing infrastructure and perform the tests.

What is needed is a strategy and technique that improves the management and prospects for success of the testing process.

Present-day semiconductor manufacturing environments include the following characteristics that limit the ability of an environment to support the manufacture of complex, high-value products. First, stand-alone equipment controllers have limited communications capability and limited provisions for external process control. Second, semiconductor manufacturing environments are limited by "static" (nonadaptive) process control approaches. Furthermore, present-day semiconductor manufacturing environments lack models to support the development and use of control algorithms. In addition the manufacturing environments are supplied by nonuniform, disparate, and incomplete sources of manufacturing data for driving process control algorithms. Closed, monolithic factory system architectures prevent integration of new capabilities, especially from multiple suppliers.

SUMMARY OF THE INVENTION

In accordance with an aspect of the present invention, an Advanced Process Control (APC) framework, which is based on a Common Object Request Broker Architecture (CORBA) technology, includes a set of cooperating components to address the above-mentioned problems. Components appearing as CORBA objects are designed to attain the facility and simplicity of plug-and-play operation. The APC framework integrates with a legacy Manufacturing Execution System (MES) and enables run-to-run control for multiple equipment in semiconductor manufacturing.

The APC Framework performs automatic process control operations through the design and development of a software framework that integrates factory, process, and equipment control systems. The APC Framework benefits semiconductor-manufacturing manufacturing, factories, or "fabs," throughout the development of the APC Framework by using an iterative development approach. The APC Framework is designed to integrate seamlessly with commercially-available APC tools The APC Framework specifies components and a component structure that enable multiple vendors to build and sell framework-compatible products using an open architecture that accommodates plug-and-play components. The APC Framework advantageously increases product yield distributions and equipment utilization, and lowers defect densities.

Performance specifications of the APC Framework are driven by the requirement for reduced feature size on semiconductor wafers. The APC Framework is integrated with manufacturing tools and a File Control System (FCS). Components of APC Framework are to be commercially or internally supported at some time in the future. APC process control models/algorithms are developed internally. The APC Framework augments existing equipment controllers.

In accordance with an embodiment of the present invention, a computer program product includes a computer usable medium having computable readable code embodied therein including a process control software system controlling a process having a plurality of devices communicating in a network, the devices including a metrology machine, a processing machine, and a controller. The process control software system includes a metrology machine plan routine controlling operations of the metrology machine. The metrology machine plan routine generates a human readable text describing activities to be exercised by the metrology machine and data to be collected and analyzed by the metrology machine. The process control software system also includes a processing machine plan routine controlling operations of the processing machine. The processing machine plan routine generates a human readable text describing activities to be exercised by the processing machine and data to be collected and analyzed by the processing machine. The process control software system further includes a strategy routine controlling operations of the controller. The strategy routine coordinates activities of the metrology machine plan and the processing machine plan that span multiple processing steps of the process.

The illustrative test system and operating method have many advantages. Advantageously, the Object Management Group (OMG) Interface Definition Library (IDL) supports the definition of interfaces. The interfaces are stable so that clients and servers are developed independently. Independent development is best accomplished through usage of OMG IDL in the definition of exceptions, attributes, and sequences.

The OMG IDL-to-C++ advantageously supports standard and alternative mappings for modules. The OMG IDL-to-C++ supports a standard mapping for compilers that support name spaces and nested classes and an alternative mapping for other compilers. The alternative mappings disadvantageously may result in portability problems. Furthermore, OMG IDL advantageously supports a number of basic and constructed data types that are mapped via an IDL compiler into data structures suitable for a particular programming language. For example, in the C++ language data types are limited to fairly primitive types for sequences and strings. Other data structures are used that offer more functionality and do not impact performance.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The APC Framework includes specification of various project requirements, objectives, and implementation criteria. The APC Framework further defines a list of high-level system functions, a set of system-level use cases, and a data dictionary defining a glossary of terms and concept definitions. The APC Framework also includes specification of a system-level architecture design and identification of subsystems. In the illustrative embodiment, the APC Framework utilizes an Object Modeling Technique (OMT) methodology to set forth the design approach and artifacts generated.

Once the APC Framework subsystems are identified, the APC Framework proceeds through an iterative process of analysis, design, implementation, deployment, and commercialization following a final iteration. In each phase, the APC components are incrementally enhanced in functionality. For each successive iteration, emphasis on component functionality is decreased and replaced by emphasis on applying the framework to solving APC problems of increasing complexity. At the end of an iteration, a comprehensive integration test is performed to ensure that all components work according to the IDL specifications and a performance evaluation is completed before the components are deployed in a fabrication facility.

The iterative process allows rapid evaluation and validation of the APC Framework concepts. Each analysis phase at different iterations allows reevaluation of design philosophy and approach, tools, and methodologies, before further enhancing the system.

In the illustrative embodiment, the APC Framework is implemented in framework components using C++ on Windows NT-based platforms. Some user interface clients are implemented in Java.

Figure 1:
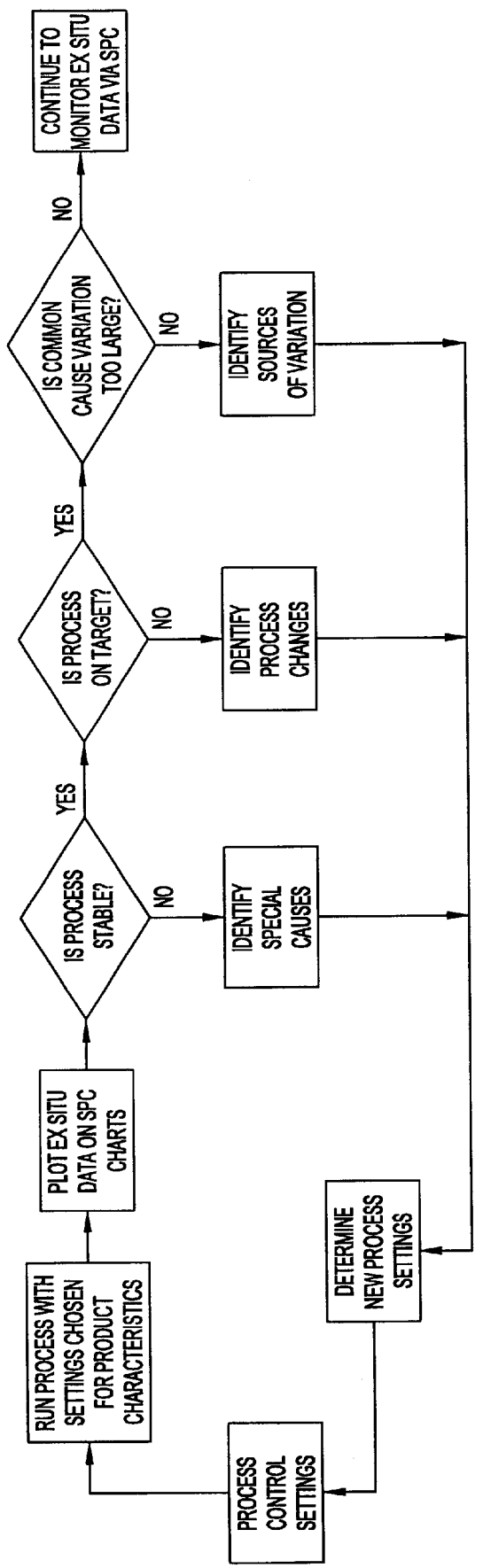
FIG. 1, labeled PRIOR ART, is a schematic block diagram showing a traditional SPC process.
Figure 2:
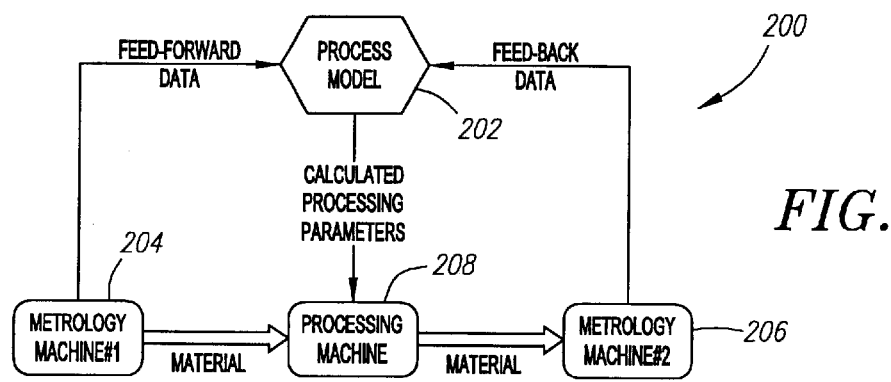
FIG. 2 is a schematic block diagram showing material flow of a semiconductor manufacturing process from a process engineer perspective.

Referring to FIG. 2, a schematic block diagram shows material flow of a semiconductor manufacturing process from a process engineer perspective. The diagram shows how the APC Framework 200 supports a typical run-to-run control scenario. The diagram is presented from the perspective of the framework's primary user, the Process Control Engineer. Concepts including "plan" and "strategy" clarify ideas and crystallize concepts. A "plan" is a human readable text describing activities that are exercised and data that is collected and analyzed. Plans orchestrate all APC activities. A strategy is similar to a higher level plan, but coordinates activities that span multiple processing steps. For example, a strategy specifies the order of running of plans.

The illustrative APC Framework 200 includes a process model 202 that receives feed-forward and feed-back data and calculates a processing parameter. The illustrative portion of the APC Framework 200 includes two measurement devices, in particular a pre-process metrology machine 204 and a post-processing metrology machine 206. The pre-process metrology machine 204 performs a measurement on a material prior to processing in a processing machine 208 and sends the measurement, as feed-forward data, to the process model 202. The processing machine 208 sends processed material to the post-processing metrology machine 206 to measure post-process data which is sent to the process model 202 as feedback data.

Plans in the APC Framework 200 include a pre-process metrology plan #1 210, a process material plan #2 212, and a post-process metrology plan #3 214 which are defined within the APC strategy #1 216.

Figure 3:
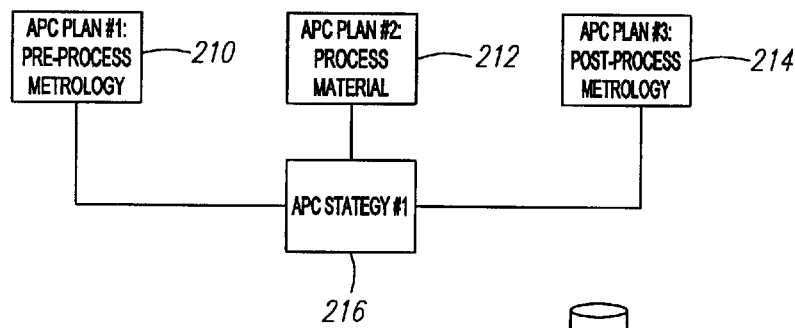
FIG. 3 is a schematic block diagram showing material flow of a pre-process measurement step of a semiconductor manufacturing process from a process engineer perspective.
Figure 3:
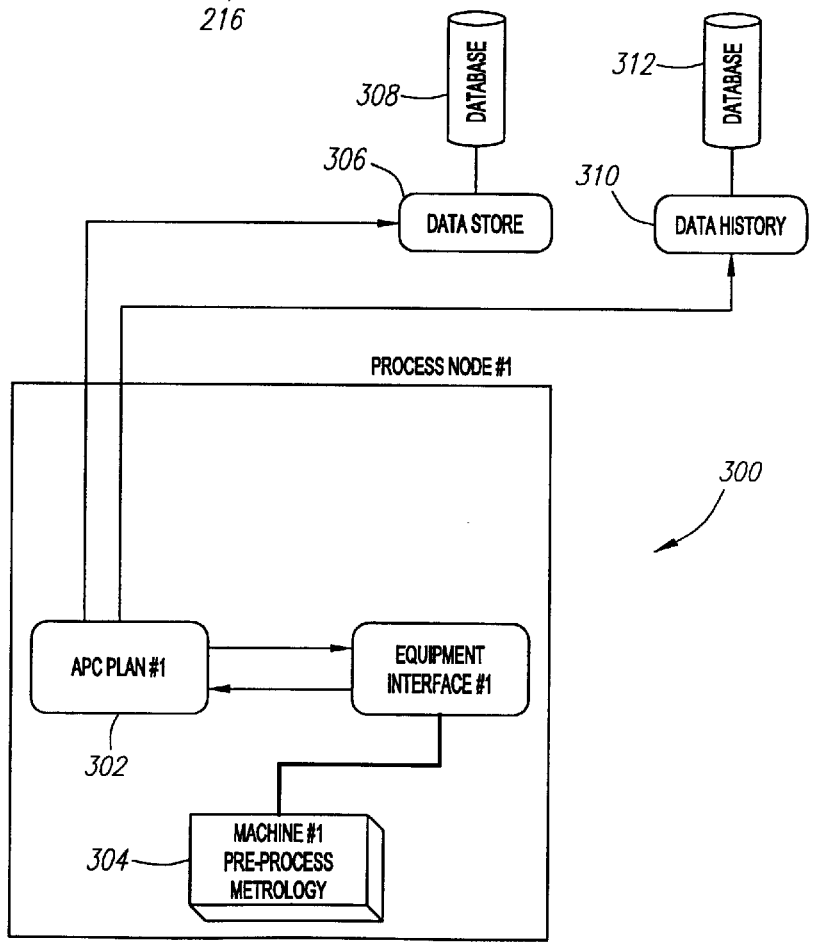

Referring to FIG. 3, a schematic block diagram shows material flow of a pre-process measurement step 300 of a semiconductor manufacturing process from a process engineer perspective. An APC plan 302 sends a message to a machine 304 to measure a material. The machine 304 sends measured measurement data back to the plan 302. The plan 302 stores the measurement data in a data store 306 of a database 308 for usage at a processing step. The plan also sends the measurements to a data history store 310 of a historical database 312.

Figure 4:
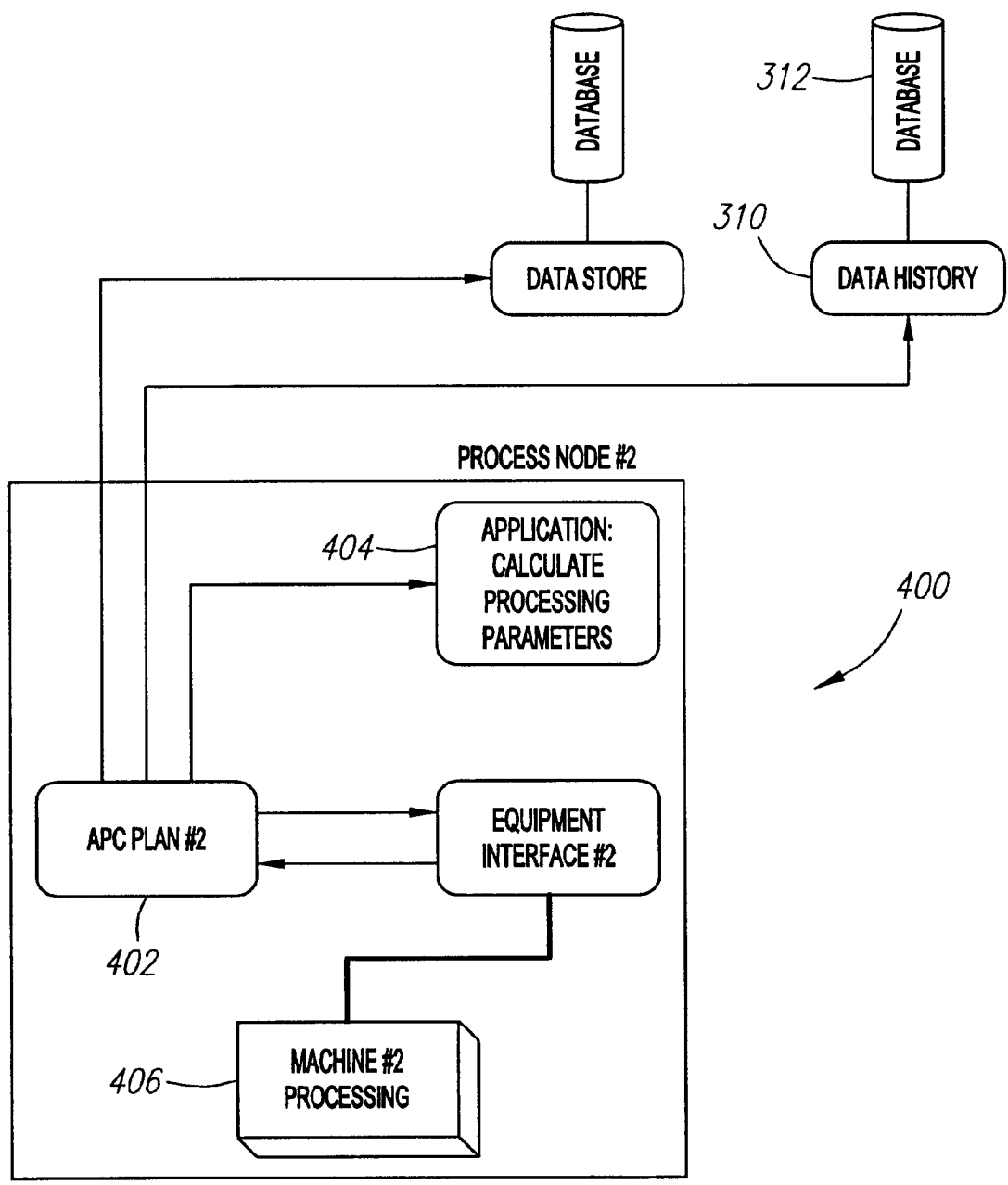
FIG. 4 is a schematic block diagram showing material flow of a processing step of a semiconductor manufacturing process from a process engineer perspective.

Referring to FIG. 4, a schematic block diagram shows material flow of a processing step 400 of a semiconductor manufacturing process from a process engineer perspective. An APC plan 402 retrieves a process model from the data store 306, then executes a parameter calculation algorithm 404. The APC plan 402 gives the calculated parameters to a machine 406 and directs the machine 406 to execute the process. The machine 406 issues a signal to the APC plan 402 when the process execution is complete. The APC plan 402 sends the calculated parameters to the data history store 310 of the historical database 312.

Figure 5:
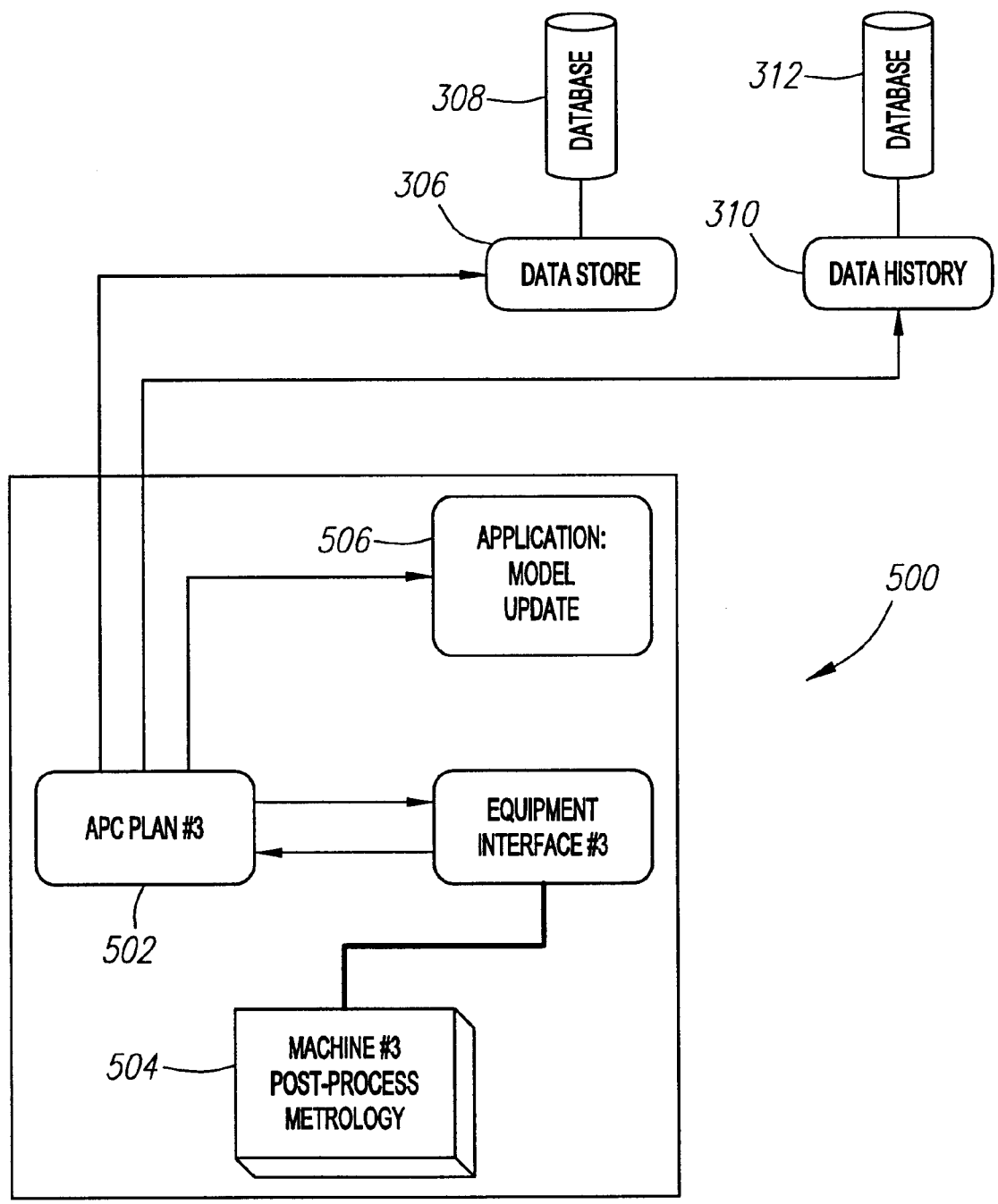
FIG. 5 is a schematic block diagram showing material flow of a post-process measurement step of a semiconductor manufacturing process from a process engineer perspective.

Referring to FIG. 5, a schematic block diagram shows material flow of a post-process measurement step 500 of a semiconductor manufacturing process from a process engineer perspective. An APC plan 502 sends a message to a machine 504 instructing the machine 504 to measure a post-processed material. The machine 504 sends measurement data to the APC plan 502. The APC plan 502 retrieves an old process model from the data store 306. The APC plan 502 executes a model update algorithm 506. The APC plan 502 stores an updated model in the data store 306 for usage in the processing step 400. The APC plan 502 sends new model data to the data history store 310 of the historical database 312.

Figure 6:
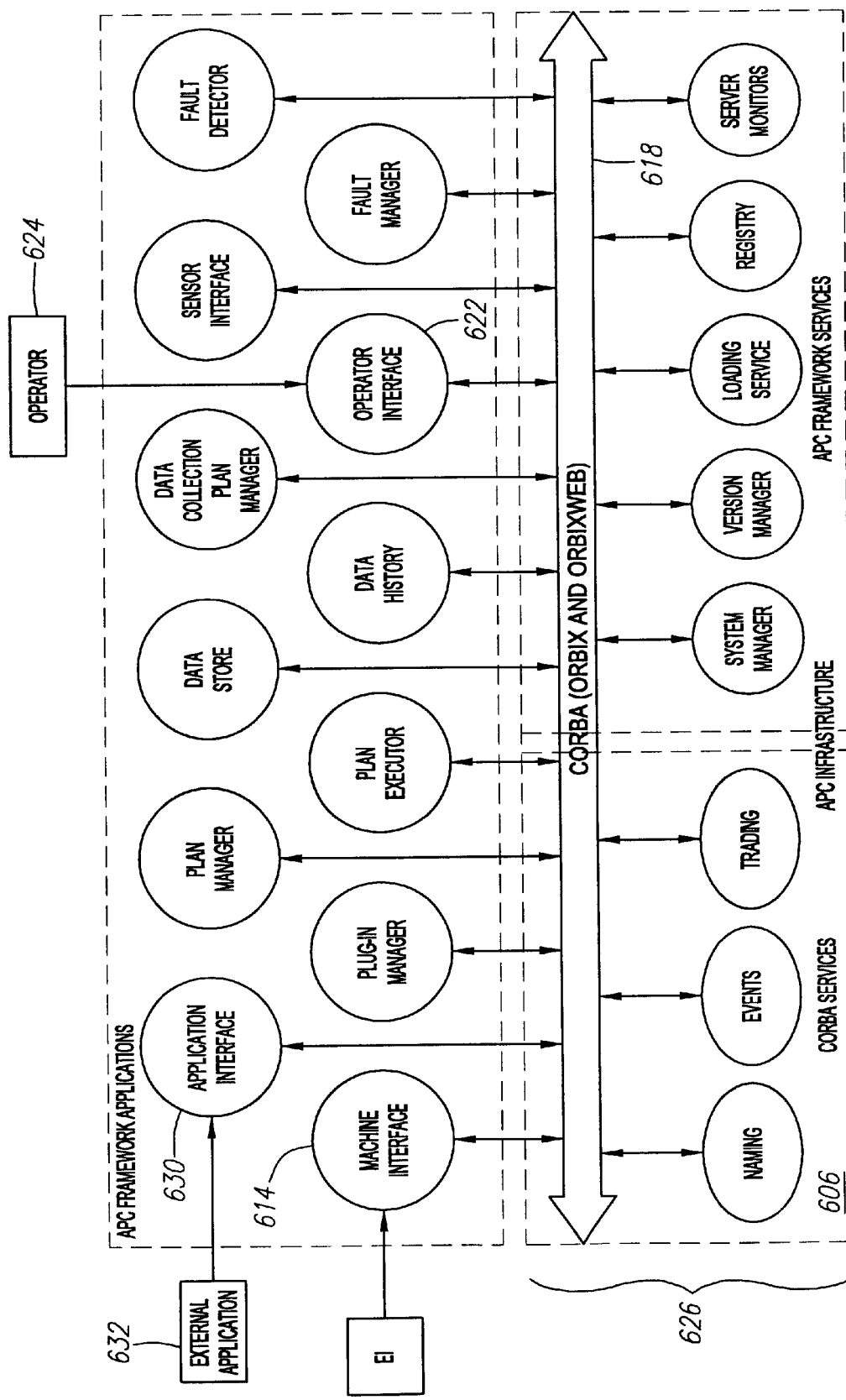
FIG. 6 is a schematic block diagram showing APC Framework components that support APC scenarios.

Referring to FIG. 6, a schematic block diagram shows APC Framework components that support APC scenarios. TABLE I summarizes the APC components and the primary functionality of the components.

| Component | Description |
| --- | --- |
| Execution/Control/ Monitoring Components | |
| Plan Execution | Provides for execution of APC strategies, plans, and associated process control scripts, interacting with other components as dictated by the contents of the scripts to provide desired process control functionality. |
| Fault Detection Monitoring | Provides factory operations and engineering personnel with a "window" into the current and past state of processing equipment, including processing activity, alarms, and faults. |

-continued

| Component | Description |
|---|---|
| Capability Providers | |
| Machine Interface | Provides an interface between MES equipment interfaces (EIs) and the APC representation of a fab tool. Primarily translates between EI-specific communications and APC CORBA. |
| Sensor Interface | Provides the appropriate interface environment to execute sensor data acquisition Plug-in applications (e.g., Labview VI). |
| Operator Interface | Facilitates communication between a wafer fab technician (WFT) and the APC system via a graphical user interface (GUI). |
| Application Interface | Provides the appropriate interface environment to execute control Plug-in applications such as Matlab and Mathematica. |
| Document Management Components | |
| Document Management | Provides base implementation of documents under version control for extended implementation by other Document Management components (Data Collection Plan Management, Plug-in Management, and Plan Management). |
| Data Collection Plan Management | Extends Document Management for configuration and management of data collection plans, associated duration plans, sampling plans, and reporting plans. At run time, provides the appropriate plan to Plan Execution Management component. |
| Plug-in Management | Extends Document Management for definition, importing, and management of process control Plug-in applications that are developed with tools external to the APC system, such as Matlab, Mathematica, MatrixX, etc. |
| Plan Management | Extends Document Management for definition, configuration, and management of APC strategies, plans, and scripts, and defines when they are to be used. At run time, tracks strategy execution progress. |
| Sign-Off Management | Provides change management, sign-on, and effectivity administration to support other Document Management components. |
| Data Storage Components | |
| Data Store | Stores and retrieves control models and status data required for process control. |
| Data History | Provides for historical repository and archival of APC data for use in off-line analysis. |
| Administrative Support Components | |
| Component Management | Provides administrative, configuration, event, and state services for all servers developed for the APC framework. |
| System Management | Defines, groups, installs, and manages the components in the APC system. |
| Logger | Provides centralized services for capturing activity and trace information for diagnostic and monitoring purposes. |
| Registry | Maintains a centralized repository of component configuration information, including setup values, system environment settings, and lists of dependent objects and event channels. |
| CORBA Services Components | |
| Events | Provides basic support for asynchronous events (decoupled event suppliers and consumers), event "fan-in," notification "fan-out," and-through appropriate event channel implementations-reliable event delivery. |
| Trader | Supports a service-based lookup for components to find other components which provide needed services. Component lookups can be constrained to limit the components to be retrieved, based on component-specific or instance-specific properties. |

Figure 7:
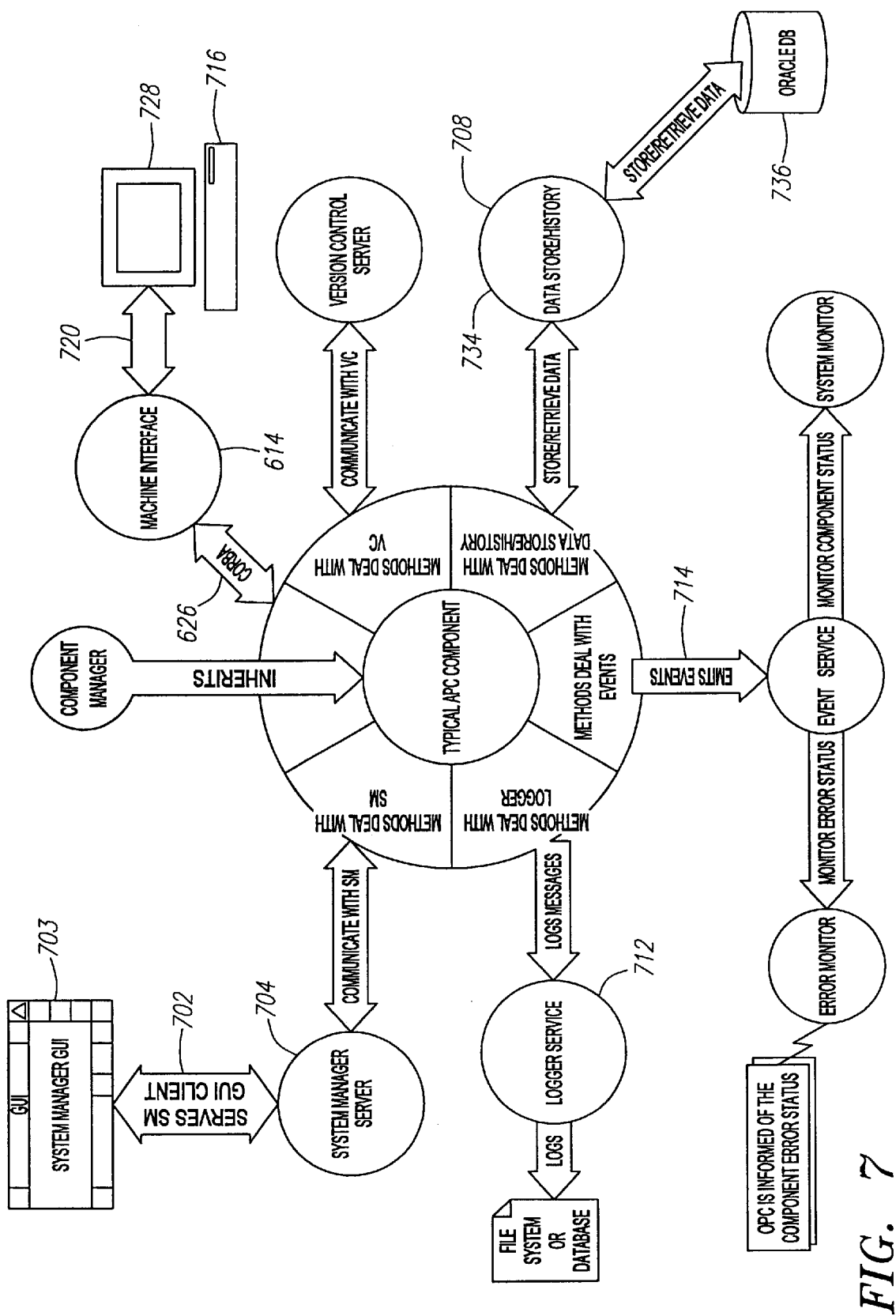
FIG. 7 is a schematic block diagram illustrating the architecture of a typical Advanced Process Control (APC) component.

Referring to FIG. 7, a schematic block diagram illustrates the system architecture of a typical Advanced Process Control (APC) component 700 and shows functional interconnections and architecture design details common to a plurality of components in the APC framework. The architecture diagrams show scenarios from a system architecture perspective. The architecture diagrams highlight how interactions between APC components achieve the desirable outcome for the Process Engineer. Boxes with rounded corners represent objects, single-headed arrows are method calls, and double-headed arrows are events.

APC components 700 have characteristics and behaviors that are defined by the APC Framework to set a base level of functionality of all components. A plurality of APC components 700 cooperate to perform APC applications such as run-to-run control and have specified common behaviors including behaviors that support installation and system administration.

The APC component architecture defines a single set of services available to all clients. A system management client 702 specifically exploits the services and interacts with various components to install initial versions and new releases of the components and to control the logging levels of the components. An Object Management Group (OMG) Interface Definition Library (IDL) interface is defined to support a base level of component functionality. All components inherit the common OMG IDL interface which sets the fundamental functionality of the component. Functionality of a particular component is further defined to supply an individual domain-specific functionality. The APC framework supplies a single implementation of the common OMG IDL interface so that domain-specific components inherit the OMG IDL behavior without concern about implementation. The common basic shared-implementation of the interface advantageously increases robustness of the system. Although a single implementation of the interface is supplied for usage of the components, individual components may have a unique implementation of the interface, if desired, so long as returned object fully supports the base OMG IDL interface.

The system management's client 702 binds to a selected component 700 at run-time and the component returns an object that supports the common OMG IDL interface. As long as the base interface supports the OMG IDL specifications, the system management client 702 safely guides a returned object to the interface. The system management client 702 can then apply operations defined for the interface to install a component, upgrade a component, and control the logging levels. The common base interface advantageously simplifies the implementation of the system management client 702 across a wide range of components.

The system management client 702 is the component that calls a bind function to obtain object references. Other components, except a trader component, import bindings from a trading service (not shown). The ACP architecture localizes uses of the bind operation because, although supplied by a number of vendors, bind is not a CORBAcompliant way to obtain the object references. In the case of a system manager server 704, bind is used to break a cyclic dependency and bootstrap the system. The system manager 702 uses object references to install the components, but does not obtain the object references from the trading service until the components are installed. By using bind, the system manager server 704 obtains and exports the object references to the trader. Once the components are installed, all components can use the trader to import the object references.

The trader is an initial reference that is retrieved in a non-standard fashion using bind. A CORBA 706 initialization service supplies a standard technique to resolve initial references using the Object Request Broker(ORB), but only uses a conforming implementation to support a naming and interface repository. In the illustrative embodiment, the trader is not a mandatory reference that is resolved using the ORB so the ORB is used to resolve an initial reference to the naming service and the naming service is used to find the trader. In other embodiments, the trader service is obtained via a call to bind. The call to the bind function is localized inside a single procedure. After acquiring the trader, other references are resolved either through the trader or by applying operations to objects that are retrieved from the trader. In further additional embodiments, the trader is a mandatory reference.

A profile contains component-specific information that can be specified after the component 700 has been compiled. The profile is loaded at run time by the component 700 when the component is started. The system manager 702 creates the profile as part of the installation of a component. The profile is stored in a registry 708 for later retrieval. At run time, the name of the APC component 700 is passed on a command line (not shown). The APC component 700 uses the component name to access the profile allocated to the component in the registry 708. The profile includes three sequences: a first sequence containing internal variables, a second sequence containing environment variables, and a third sequence containing the binding variables.

The profile specifies internal variables for component-specific settings. For example, a component may use a first database during testing and a second database during production. In another example, a component may capture timing and tracing information during testing, but not during deployment. Internal settings in a profile are represented as a sequence of name-value pairs where the value is a string.

The profile has environment variable settings that are used, for example, to support operation of components that integrate legacy systems. For example, a CORBA component that acts as an Oracle client 710 has a LIBPATH set to dynamically load Oracle client libraries correctly. Failure to correctly set the LIBPATH results in a runtime exception. The environment variables inside a profile are represented as a sequence of name-value pairs where the value is a string.

The profile has binding variables that specify a selection criterion used at runtime to import service providers to the APC component 700. In multi-tier architectures, components that use the services of other components are prevalent. For a robust system, APC components 700 do not statically bind to these service providers. Instead, the APC components 700 dynamically acquire service providers at runtime for greater flexibility and robustness. If a requested service provider is inoperable for an extended time, the service provider is selectively replaced by changing the binding information in the profile. A binding variable is also used to locate either a logging service 712 that the APC component 700 uses to send timing and tracing information, or the event channels 714 the APC component 700 uses to send and receive events. Binding variables are stored in the profile as a sequence of name-value pairs where the value is a structure defined in OMG IDL as:

struct BindingValue{ string type; string constraint; boolean mandatory_presence; };
struct BindlngVariable{ string name; BindingValue value; };
typedef sequence<BindingVariable >BindingVariableSeq;

The mandatory presence field is used because some bindings are optional. For example, components can be coded to operate with or without a particular binding.

One example of the usage optional bindings arises for a APC component 700 that connot connect to the logging service 712 after successfully processing a long-duration operation. Although the operation is successful, the log is not found, possibly because the log is contained on a machine that is temporarily inoperable. Rather than unwisely aborting the operation merely because the logging service is not found, a better solution is to specify an alternative log. For example, the logging utility may be implemented using a smart proxy so that a failure to connect to the logging service is addressed by logging to a local file or logging to a console based on an internal setting. A logging utility using a technique such as a smart proxy allows the binding handle to the logging service to become optional so that the APC component 700 can operate with or without the logging service operative. The binding value for the optional logging service specifies a "false" designation for the mandatory presence field.

In a distributed system, the location of failure for a thread of control is difficult to determine. A list of potential failure locations is reduced by running components on a single machine. However, the logging of some tracing information, including request, reply, and exception events, is valuable. The logging of tracing information advantageously allows the components to leave a trail so the tester can find and diagnose problems.

Performance bottlenecks are isolated in a system by determining round-trip timing information such as the time to issue a request and receive a reply in response to the request. Once roundtrip times are determined, system developers focus on improving the performance of request and response paths with a longest time duration so that the developer is best able to discover ways to optimize the request. A developer may find a request that obtains several object references, opens and closes a database, and creates a process. In such a request, performance is improved by caching references, opening the database once, and dynamically linking new functionality. The requests that extend the longest time are not always optimized, but the tuning system performance is generally improved.

In a typical system, no tools for tracing and timing intercomponent interactions exist so that support for capturing information is to be incorporated into the system. The system is to be able to disable the capturing of information in a manner that does not impact runtime performance when deployed. An advantageous technique for capturing information is to use filters or interceptors that are called by the ORB at key points during the servicing of a request. Such key points include the time of sending a request, the time of receiving a request, and the time of sending a reply. The filters are implemented to log the tracing and timing information to a central server. The filters achieve correct logging of the information without the application programmers having to make explicit calls.

The System Management Component 702 is used to perform system management and configuration on APC components. An entire APC system uses a single System Management component 702. The System Manager 702 does not have to be present for APC components to continue running. The System Management Component 702 has two subcomponents: the System Manager Server 704 and the System Manager Graphical User Interface (GUI) 703. The System Manager Server 704 communicates with the APC components directly, whereas the System Manager GUI 703 communicates only with the System Manager Server 704 via CORBA. The System Manager GUI 703 can be replaced by any available GUI implementations (e.g., Java, Virtual Basic, or PowerBuilder) that comply with CORBA, while the business rules and database access are left strictly to the System Manager Server 704.

A Machine Interface Component 714 is an interface to a single piece of semiconductor processing or metrology equipment 716. Through the Machine Interface 714, the APC system delivers processing parameters, controls equipment operation, collects equipment status information, and receives collected data. The Machine Interface 714 bridges the gap between an existing Equipment Interface (EI) 716 and the APC framework. The Machine Interface 714 translates specific selected messages and events on a CORBA bus 718 to an Isis bus 720, and back to the CORBA bus 718. The Isis bus 720 is used by the Equipment Interface 716. The Machine Interface 714 also facilitates the startup and shutdown operations that are initiated by the System Management Component 702. The Machine Interface 714 makes publicly available a CORBA event channel. All CORBA events generated by the existing Equipment Interface (EI) 716 are made available on the CORBA bus 718. In the illustrative embodiment, every instance of a Machine Interface 714 is associated with one and only one (CORBA) Plan Execution Manager and one and only one Equipment Interface 716.

An Operator Interface (OI) 722 component facilitates communication between an operator 724, for example a Wafer Fab Technician, and the APC system. Through a CORBA interface 726, the component allows users to display a variety of pop-up dialogs simultaneously on any number of displays 728. The Operator Interface 722 also supports for the startup/shutdown and logging features used by the System Management Component 702.

The OI component 722 has a title base attribute that specifies a string common to all pop-ups. Operations that display pop-ups add either static or user-defined suffixes to the title. For example, if the attribute is set to "CVD09," a call to the notify operation would display a pop-up with "Foo Notification" as the title, whereas a call to the query operation would display a pop-up with "CVD09 Query" as the title.

The OI component 722 also has a display list that specifies the displays in which a pop-up could appear. As a parameter to a pop-up operation, the user may specify that a pop-up appear in only a subset of the display list. Additional operations are defined that allow users to add and remove displays from the display list.

The OI component 722 includes a flexible mechanism for displaying information to the operator via pop-ups. A generic pop-up operation allows users to specify the title suffix, the text message, a list of button labels, an optional response string, a priority level, an optional time out, and a list of displays.

In addition to the generic pop-up, several operations are defined that display specialized pop-ups. These include a notify pop-up that displays a message and "OK" button, a query pop-up that displays a message and "Yes" and "No" buttons, and a prompt pop-up that displays a message, response string, and "OK" button.

An announcement operation is defined as a one-way message that displays a simple pop-up with message and "OK" button. Unlike the other pop-ups, the operation does not wait for user dismissal. This operation does not return any information.

After dismissal, all pop-up operations except the announcement pop-up return the button label that was pressed and the particular display that dismissed the pop-up. If the pop-up displayed a response string, the operator's response is returned. If the pop-up had a time out, a boolean is returned indicating if the pop-up was dismissed due to time out. Dismissing a pop-up on one display causes the pop-up to be removed from all other displays on which it was shown.

An Application Interface (AI) component 730 supplies an interface to an external application 732, usually an application that runs a control algorithm. The AI 730 executes Plug-ins inside an application associated with the AI component 730. The Plug-in object contains user-supplied code and non-APC data such as algorithmic constants and setup parameters for the application. The Plug-in executes in the manner of a function call. The Plug-in receives Input parameters. When the Plug-in has finished receiving the Input parameters, the Plug-in returns and supplies Output parameters. The AI component 730 translates data transferred between the Plug-in and APC.

A Data Store Component 734 is used to store APC data created during StrategyRuns. The Data Store Component 734 stores two types of information including permanent data that stores values used by the APC system across runs and Temporary data that APC scripts use to store any general values for a particular strategy run. Examples of permanent data include default model parameter and recipe adjustment values. The Data Store Component 734 provides persistent storage for the APC Plan Execution component. The Data Store Component 734 interacts with the Plan Executor 808, which is described in the discussion of FIG. 8A, as an only client.

The APC system also includes a Data History Component 736. When the APC is running, a data storage location is used to record event occurrences. When a run starts, a recipe changes, run data is collected, or a model parameter value changes, all events are logged so that data collected is later retrieved and analyzed. The APC framework presumes that the history data analysis package is outside the system, and thus a relational database is chosen to store historical records. The data history is stored in a relational-friendly way for retrieval efficiency and usability, as opposed to a more object-oriented view.

The APC component 700 is a fundamental building block of the APC Framework which is distributed, object-oriented, and based on the standards of CORBA, CORBA services, and CORBA facilities. Individual APC components 700 are defined to achieve interoperability so that components operate together, substitutability so that components can be replaced or upgraded, extensibility so that component functionality can be extended and specialized, scalability so that the APC Framework is used on a large or small scale, and migratability so that the APC Framework evolves.

The APC Framework is designed to integrate with legacy systems such as existing monolithic shop floor control systems. Furthermore, the APC Framework integrates with existing process modeling tools such as Matlab and Matrix-X.

The system functional requirements are derived primarily to support two typical scenarios including run-to-run control, and fault detection and classification. Run-to-run control is a model-based process control that usually involves more than one piece of processing equipment. In a typical usage scenario, the results of material processing at one piece of equipment are passed, or "fed-forward" to a subsequent manufacturing step, and used to influence the future processing of the same material. In the APC Framework, run-to-run control is performed according to mathematical process models, and a single application accommodates multiple feed-forward and feedback loops.

Fault detection and classification is model-based detection and classification of process equipment problems. Data is collected from a piece of processing equipment and analyzed using an idealized mathematical process model. Results of the analysis are used to detect the occurrence or likelihood of occurrence of an equipment fault, and to determine the type of the fault.

Both run-to-run control and fault detection and classification are supported using a single set of APC Framework components. Alternatively, the support of different types of APC functionality and adaptation to the specifications of a particular APC installation require considerable flexibility from the APC Framework design. Flexibility is achieved by assembling the APC components in different combinations to conform to application specifications.

Figure 8A:
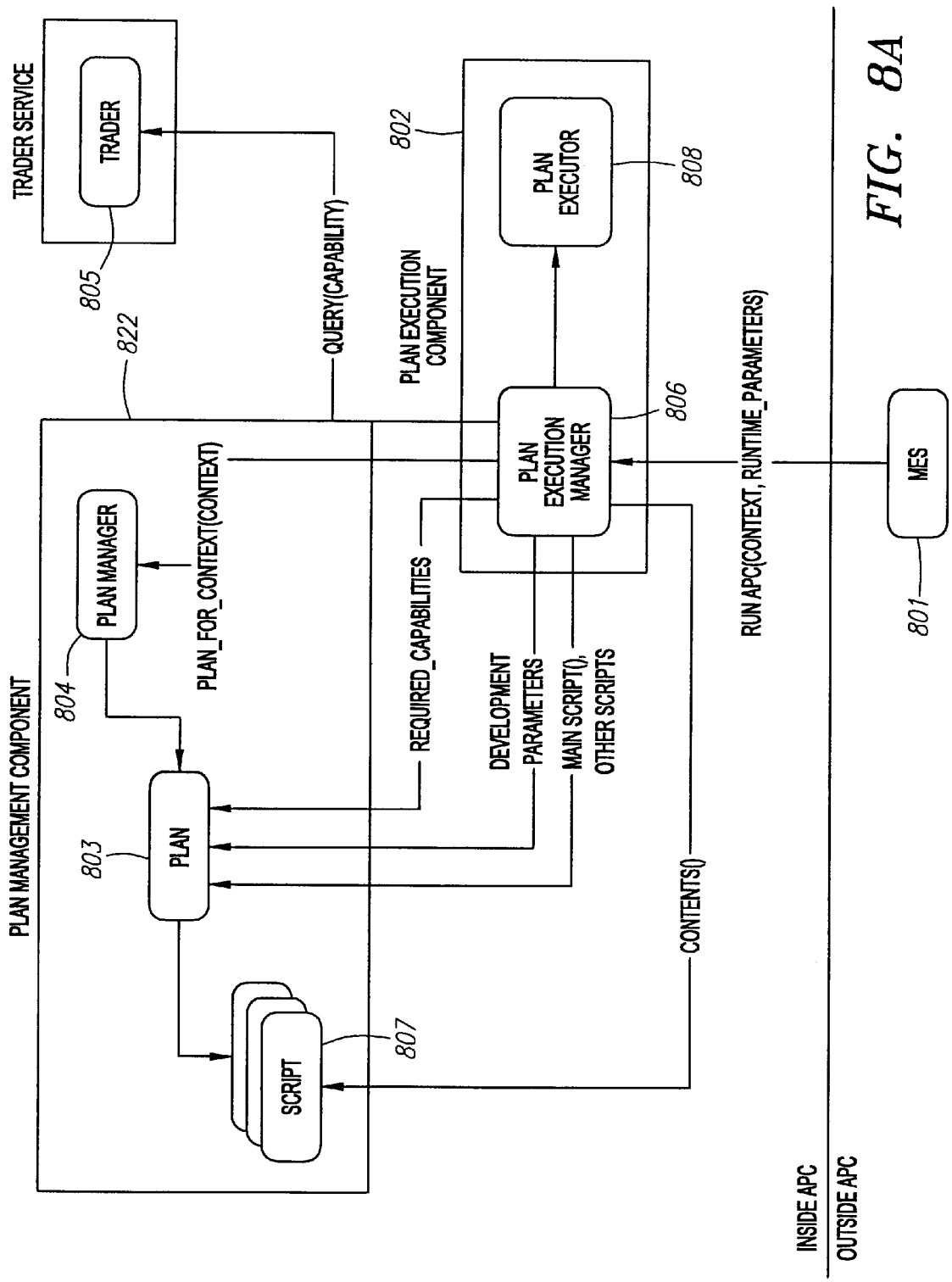
FIG. 8A is a schematic block diagram illustrating a system architect perspective in a plan startup phase an Advanced Process Control (APC) system for performing an Advanced Process Control (APC) strategy.

Referring to FIG. 8A in conjunction with FIG. 7, a schematic block diagram illustrates a system architect perspective in a plan startup phase an Advanced Process Control (APC) system for performing an Advanced Process Control (APC) strategy. A Plan Execution Component 802 services a single semiconductor processing machine (the "machine") and metrology devices associated to the machine. The Plan Execution Component 802 retrieves a plan (the "plan") and scripts associated to the plan from a Plan Manager 804 upon receipt of a "run_APC" command from a Manufacturing Execution System (MES) 801. The Plan Execution Component 802 then obtains a list of capabilities for suitably executing the plan from a trader 805, sequences the execution of the plan, and generates a report of plan execution. The report of plan execution specifies whether the plan successfully completed and reports errors, if any, resulting from plan execution.

A Plan Execution Component 802 contains one Plan Execution Manager (PEM) 806 that is responsible for the overall management of all plans executed on the assigned semiconductor processing machine and also responsible for metrology devices associated with the machine. The PEM 806 creates a Plan Executor (PE) 808 to execute a running plan 803. A PE 808 is responsible for a single plan 803. The PE 808 exists for the life span of the plan 803 and is destroyed after reporting plan 803 completion. A PE 808 executes a "main script" 807 and may execute one or more "event scripts" that are triggered by events. Functions performed by a PE 808 include: (1) Creating a script executor to execute the main script; (2) Allowing a channel for events to be received from different components; (3) Activating event script executors, for example, if triggered by an event; (4) Maintaining a sharable address space for communications between the main script and the event scripts; and (5) Supplying stubs to map calls from the scripts to external objects.

A Plan Executor (PE) 808 under normal working conditions generally interfaces with the PEM 806, a Data Store Component 810 (see FIG. 8C), the Plan Manager 804, a Machine Interface Component 812 (see FIG. 8B), an AddOnSensor Interface Component (not shown), a Data History Component 816 (FIGS. 8C and 8D), a PlugIn Manager 822 (see FIG. 8B), and various Application Interface Components (not shown). The Plan Executor (PE) 808 controls a plan startup operation determined by several control parameters including a processing context, runtime parameters, development parameters, The Plan Execution Manager (PEM) 806 manages interface calls to the APC Plan Execution Component (PEC) 802. The interface calls include:

| | |
|---|---|
| 1. executors(); | //returns a list of current executors |
| 2. executors_running_plan(); | //returns a list of Plan Executors (defined below) running the specified plan |
| 3. run_apc(); | //retrieves and executes a plan |

The PEM 806 also supplies an interface on behalf of each PE 808 associated to the PEM 806. The interface calls include:

| | |
|---|---|
| 1. plan(); | // returns the current plan and context run by the executor. This is unique since a PE runs only one plan. |
| 2. stop(); | // stops execution of the current plan at the next plan step |
| 3. suspend(); | // stops execution of the current plan at the next plan step |
| 4. abort(); | // stops execution of the current plan at the next plan step |
| 5. resume(); | // resumes execution of the current plan at the next plan step |

The illustrative interface calls may be defined differently for other applications. The depicted interface calls are selected to reflect typical functions and operations performed by a typical PE 808 and PEM 806. In other embodiments, a PEM 806 may start multiple plans concurrently using multiple PEs 808.

The Plan Manager (PM) component 804 manages APC Strategies, Plans, and Scripts artifacts. The Plan Manager 804 creates and configures Strategies and Plans. Scripts are assumed to be created by a separate Script Creation Tool. During runtime, the Plan Manager 804 provides the APC System access to the configured Strategies, Plans, and Scripts.

Plans are sequentially configured in a Strategy. Once a Strategy is selected, an executing instance, the StrategyRun, is created. StrategyRun spans the lifetime of executing all plans in a Strategy. Strategies and StrategyRuns are selected by matching them with an MES Context. This context is matched to the appropriate Strategy using a Context-Specification and a set of Context-Matching Rules. A Context-Specification is a list of specifications that match specified parameters from the context. Thus the complete configurations of a Strategy include a context specification. During runtime, the specification is used to retrieve the appropriate Strategy and execute the associated current Plan of the Strategy. Once the Plan and the Scripts contained in the plan have executed, the Plan Manager 804 prepares the StrategyRun to process the next plan.

Figure 8B:
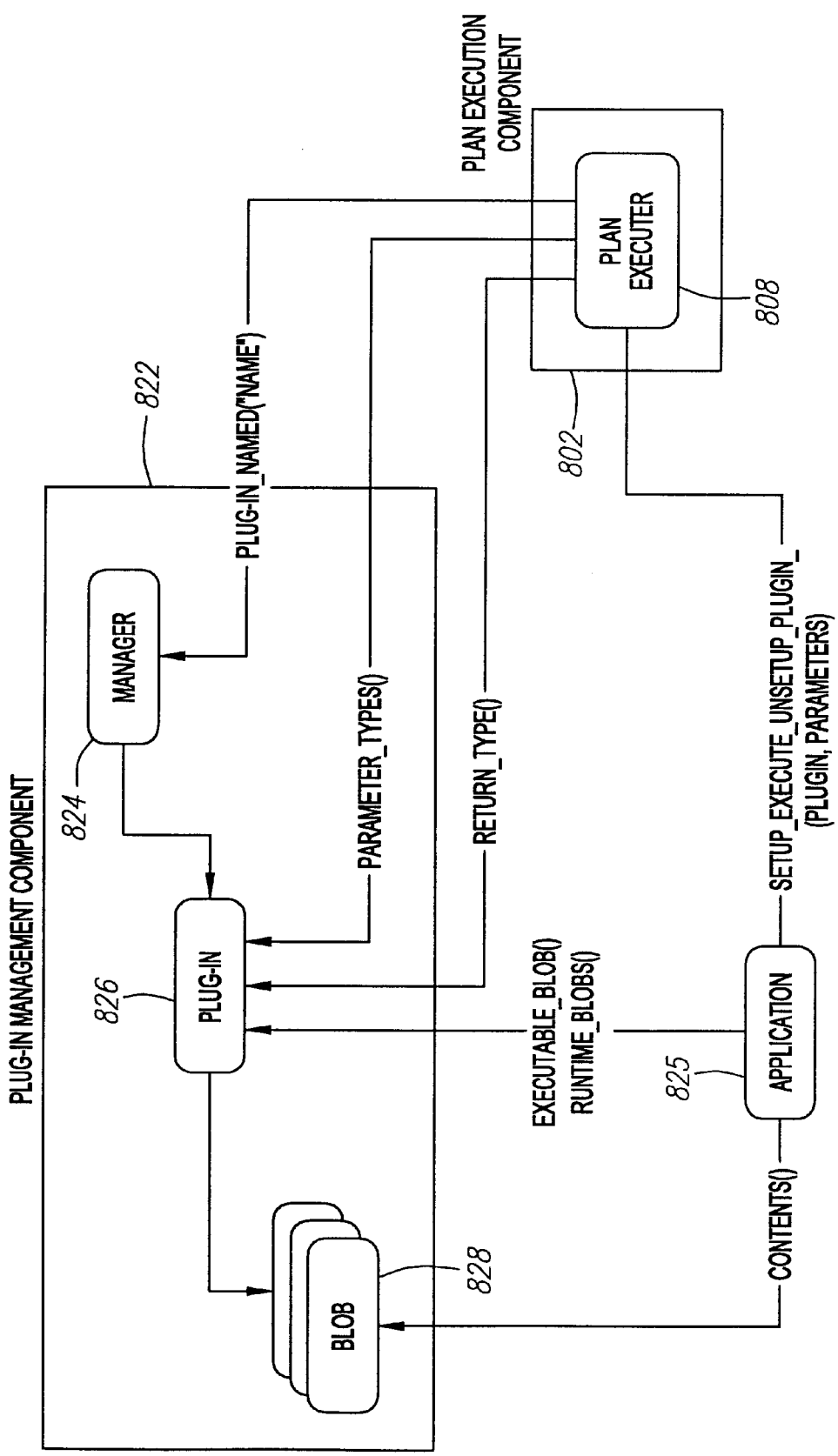
FIG. 8B is a schematic block diagram illustrating a system architect perspective of the APC system using Plug-In Execution.

Referring to FIG. 8B, a schematic block diagram illustrates a system architect perspective of the APC system using Plug-In Execution. A Plug-in Management Component 822 includes three main objects, a Manager 824, a Plug-in 826, and a Blob 828. The Manager 824 checks Plug-ins 826 and Blobs 828 out of the persistent storage and manages the memory used for Plug-ins 826 and Blobs 828. The Plug-in 826 is an object that contains user-defined executable code, any nonvolatile data used to run the code such as constants and initial values, and source code for the executable program. A Blob 828 is an envelope for data in any number of formats and is used to eliminate the need for APC to know the format of the user-defined code or data. A Plug-in 826 typically contains references to several Blobs 828.

The executable code contained in a Plug-in 826 within a Blob 828 executes in one of many possible environments including Matlab or Xmath environments. The data in other Blobs 828 referenced by a particular Plug-in 826 is formatted suitably for the appropriate environment. A limitation on the number of execution environments available from APC is undesirable so that the Blob 828, as a generic envelope, is defined to shield the APC from the specific code and data formats of each execution environment. An Application object 825 configures the Blob 828 for usage in the appropriate execution environment. The format of the Blob 828 contents are immaterial to the Manager 824 and the Plug-in 826.

The Manager 824 calls the constructors and destructors of the Plug-in 826 and Blob 828, and passes references to Plug-ins 826, when requested.

Figure 8C:
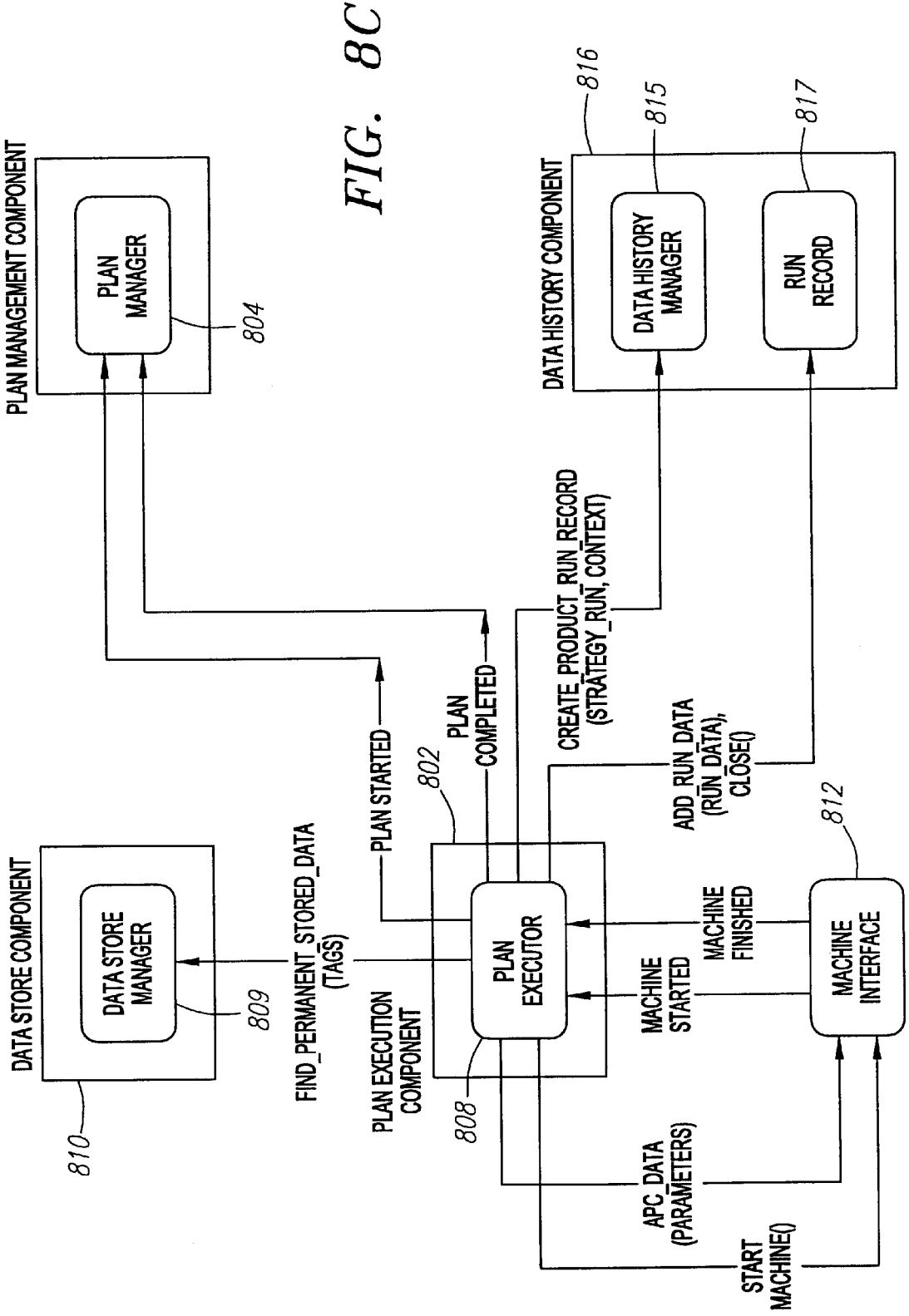
FIG. 8C is a schematic block diagram illustrating a system architect perspective of the APC system during a Processing Measurement Step.

Referring to FIG. 8C, a schematic block diagram illustrates a system architect perspective of the APC system during a Processing Measurement Step. Following startup, the Plan Executor (PE) 808 notifies the Plan Manager 804 that the plan is started and retrieves permanent stored data tags from the data store manager 809 of the Data Store Component 810. The plan executes a plug-in to calculate new processing parameter values. The PE 808 sends APC data parameters and a start machine signal to the Machine Interface Component 812. The Machine Interface Component 812 begins operating and sends a "machine started" signal to the PE 808. When the operation of the Machine Interface Component 812 is complete, the Machine Interface Component 812 sends a "machine finished" notification to the PE 808. The PE 808 generates and sends a product run record 817 to the data history manager 815 of the Data History Component 816 and sends run data to the run record 817 of the Data History Component 816. The PE 808 sends a plan completed signal to the Plan Manager 804. The PE 808 then terminates while the Plan Manager 804 registers that the second plan for the strategy run is complete.

Figure 8D:
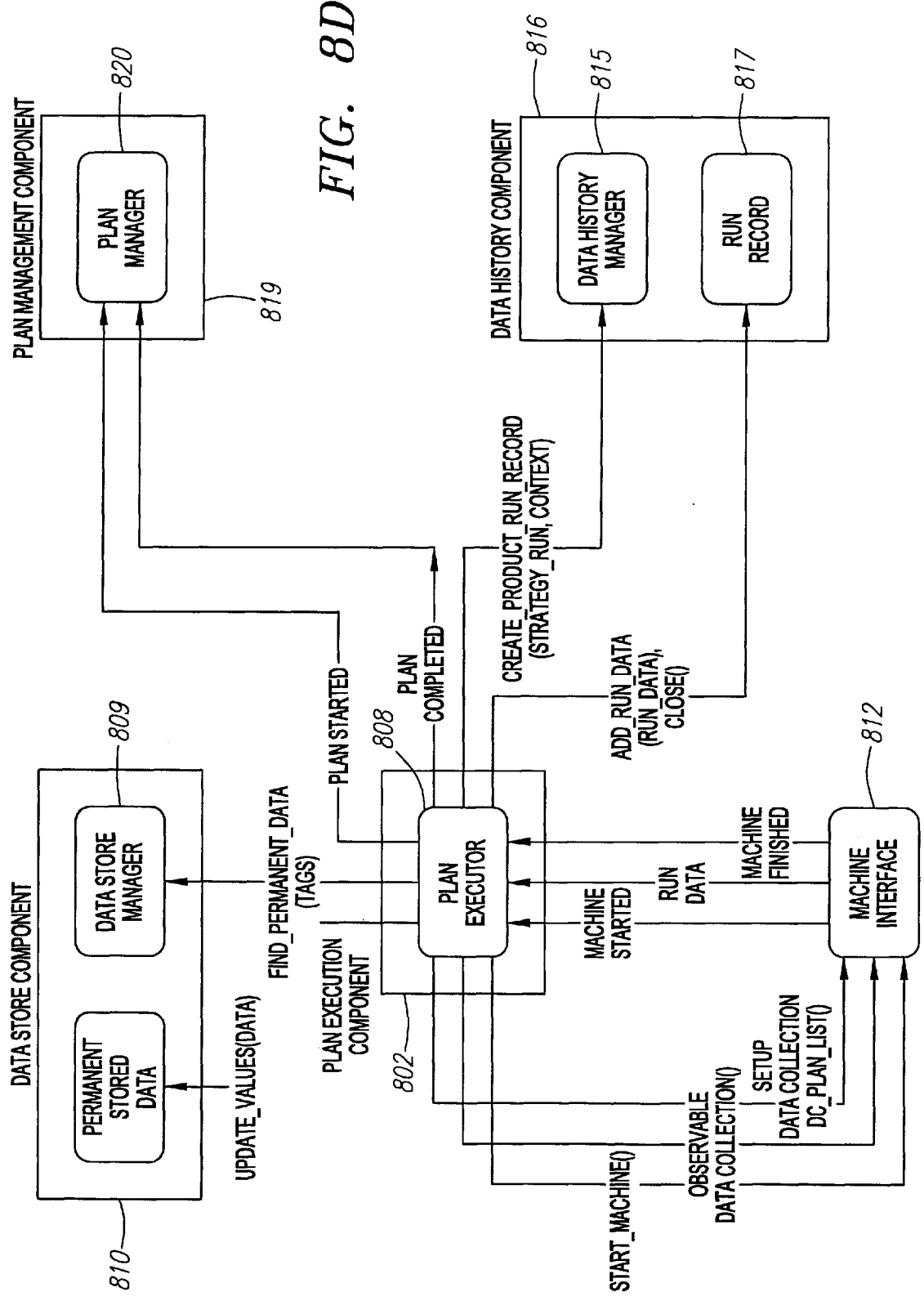
FIG. 8D is a schematic block diagram illustrating a system architect perspective of the APC system during a Post-Processing Measurement Step.

Referring to FIG. 8D, a schematic block diagram illustrates a system architect perspective of the APC system during a Post-Processing Measurement Step. The Plan Executor (PE) 808 performs a plan startup. Following startup, the Plan Executor (PE) 808 notifies the Plan Manager 804 that the plan is started and sends data collection information to the machine interface 812 including a setup data collection and an observable data collection.

A Data Collection Plan Management Component (DCPlan) 819 describes the data that is collected by each of the machine interface 812, sensor interface (not shown) and other interfaces that collect data. The Data Collection Plan Manager (DCPM) 820 is the component responsible for the creation and management of DC Plans. The DCPlan is a data structure used exclusively by the AddOnSensor Interface Component (not shown) and the Machine Interface Component 812. The DCPlan is defined by the Plan Execution Manager (PEM) 806 including specification of the data to be collected from a particular processing equipment and how the data is reported back to the PEM 806.

The DCPM component includes two main objects: a Manager 820 and the DCPlan 819. The Manager 820 checks DCPlans out of the persistent storage and manages the memory used for DCPlans. The DCPlan is an object that contains a set of observables to be collected. The DCPlan also describes the capabilities of a data collector to carry out the data collection task stipulated in the DCPlan 819.

The PE 808 then starts the machine. The Machine Interface Component 812 begins operating and sends a "machine started" signal to the PE 808. When the operation of the Machine Interface Component 812 is complete, the Machine Interface Component 812 sends a "machine finished" notification to the PE 808. The Plan Executor (PE) 808 finds permanent stored data tags from the data store manager 809 of the Data Store Component 810 and updates values in the permanent stored data. The PE 808 generates and sends a product run record 817 to the data history manager 815 of the Data History Component 816 and sends run data to the run record 817 of the Data History Component 816. The PE 808 sends a plan completed signal to the Plan Manager 804. The PE 808 then terminates while the Plan Manager 804 registers that the plan is complete.

Figure 9:
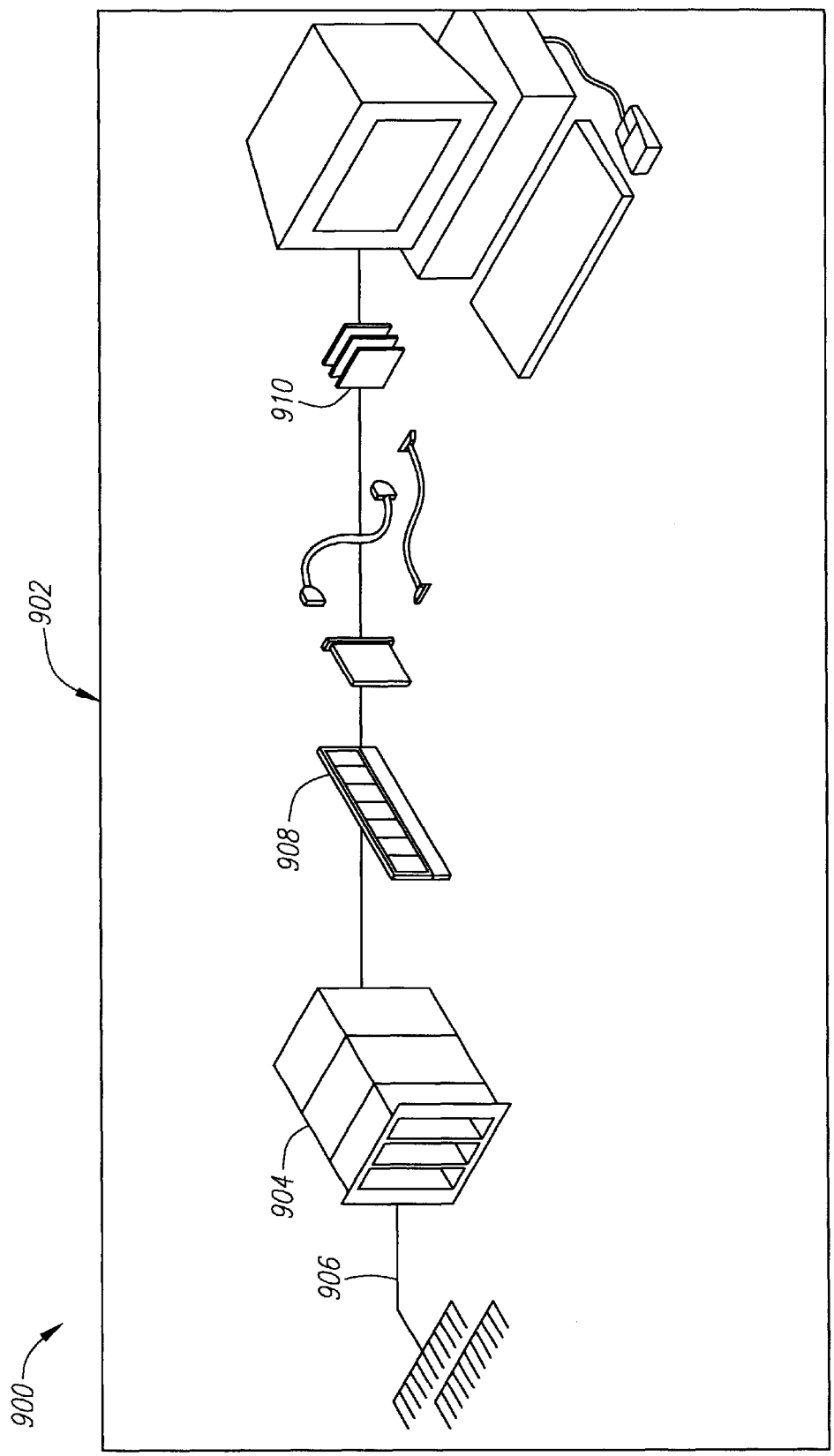
FIG. 9 is a schematic block diagram that illustrates an embodiment of an AddOnSensor Interface (SI) component.

Referring to FIG. 9, a schematic block diagram illustrates an embodiment of an AddOnSensor Interface (SI) component 900, which is the proxy for an external sensor 902 attached to any process equipment 904 controlled by the APC framework. The external sensor 902 may be a simple C++ stand-alone program acquiring data off a thermocouple wire 906, or a full-fledged LabVIEW application acquiring data using multiple transducers (not shown). Data acquisition is typically performed using a combinations of data acquisition boards 908 and signal conditioning modules 910. The external sensor 902 communicates with the SI 900 in CORBA messages. A communication layer (not shown) has been created both in the form of a Data Link Library (DLL) that is loaded into LabVIEW and in the form of a C++ class template that is used in a C++ stand-alone program. The function of the communication layer, known as DAQ, is to provide external sensors a means of understanding CORBA messages. Hereinafter a DAQ-enabled external sensor 902 is simply referenced as "DAQ 902" in this document.

The mapping between an SI 900 and a DAQ 902 is one-to-one in which multiple transducers can be connected to one process equipment. As long as the multiple transducers are controlled by a single DAQ 902, one SI 900 is responsible for facilitating communications between APC framework components and the DAQ 902. The DAQ 902 is an application program written to acquire observable measurement from the process equipment using transducers. In some embodiments, the DAQ 902 is a simple C++ program or a lull fledge LabVIEW application using signal conditioning and data acquisition boards. The DAQ 902 communicates with CORBA using either a communication layer DLL or a C++ template.

The Plan Executor (PE) 808 shown in FIG. 8A sends a Data Collection Plan (DCPlan) to the SI 900 before data collection begins at the DAQ 902. The SI 900 parses information in the DCPlan and forwards only that information pertinent to DAQ 902, including Duration Plan, Sampling Plan, Reporting Plan, Observable, and Limits. In addition, the SI 900 forwards to the PE 808 the desired data acquired by the DAQ 902 in a predefined format and in a predetermined time interval. The format and time interval are specified in the DCPlan.

Figure 10:
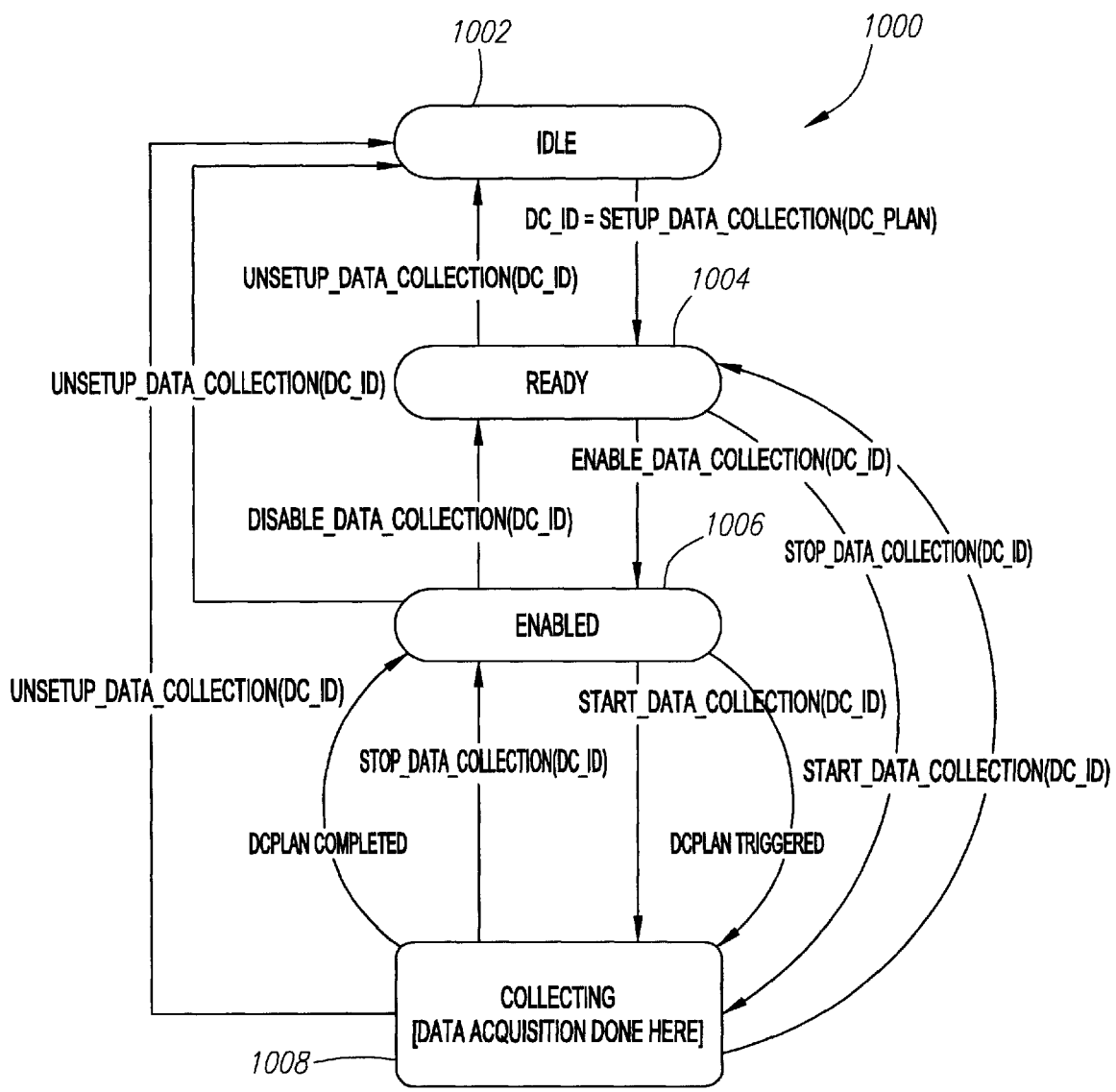
FIG. 10 is a schematic state transition diagram depicting a Data Collector.

Referring to FIG. 10, a schematic state transition diagram depicts a Data Collector 1000. The AddOnSensor (SI) Component 900 inherits the IDL interface from the Data Collector 1000. The Data Collector 1000 includes an Idle state 1002, a Ready state 1004, an Enabled state 1006, and a Collecting state 1008 that performs data acquisition. All states of the Data Collector 1000 are substrates of a component manager running state.

Figure 11:
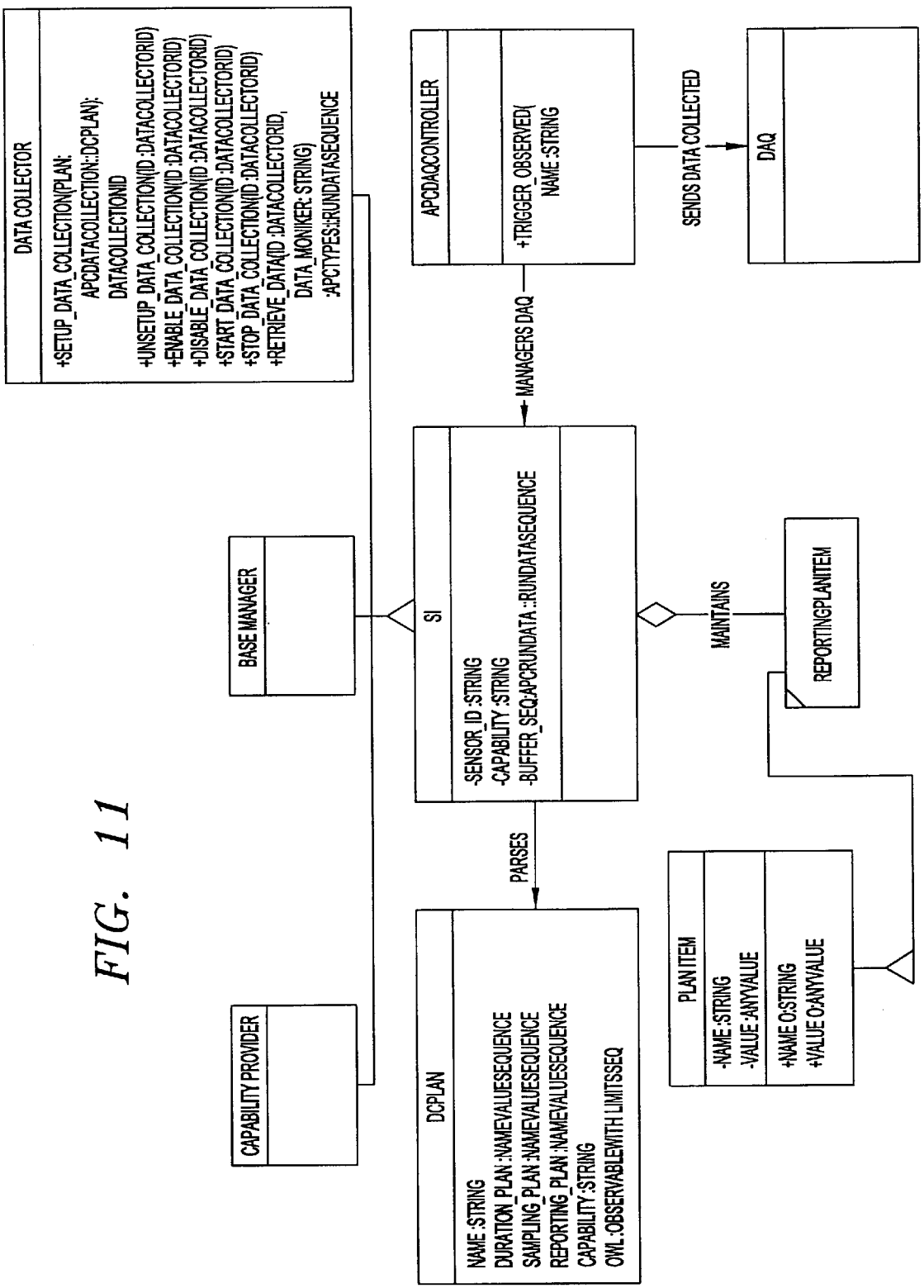
FIG. 11 is a class diagram showing an embodiment of the AddOnSensor class.

Referring to FIG. 11, a class diagram shows an embodiment of AddOnSensor class object model. The component object model diagrams use Object Modeling Technique (OMT) notations to represent the object classes and relationships among the object classes.

Figure 12:
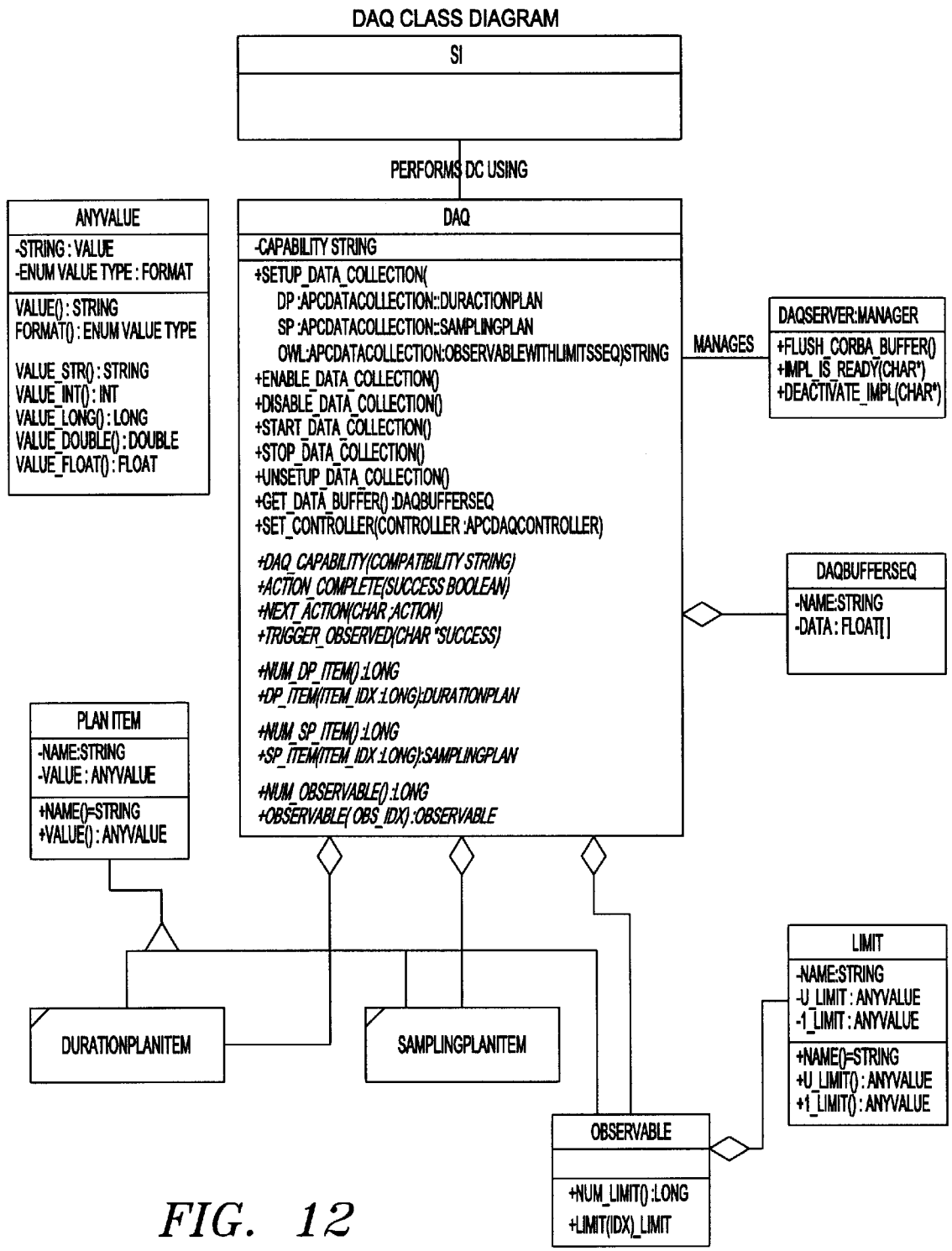
FIG. 12 is a class diagram showing an embodiment of the communication layer Data Acquisition (DAQ) class.
Figure 13:
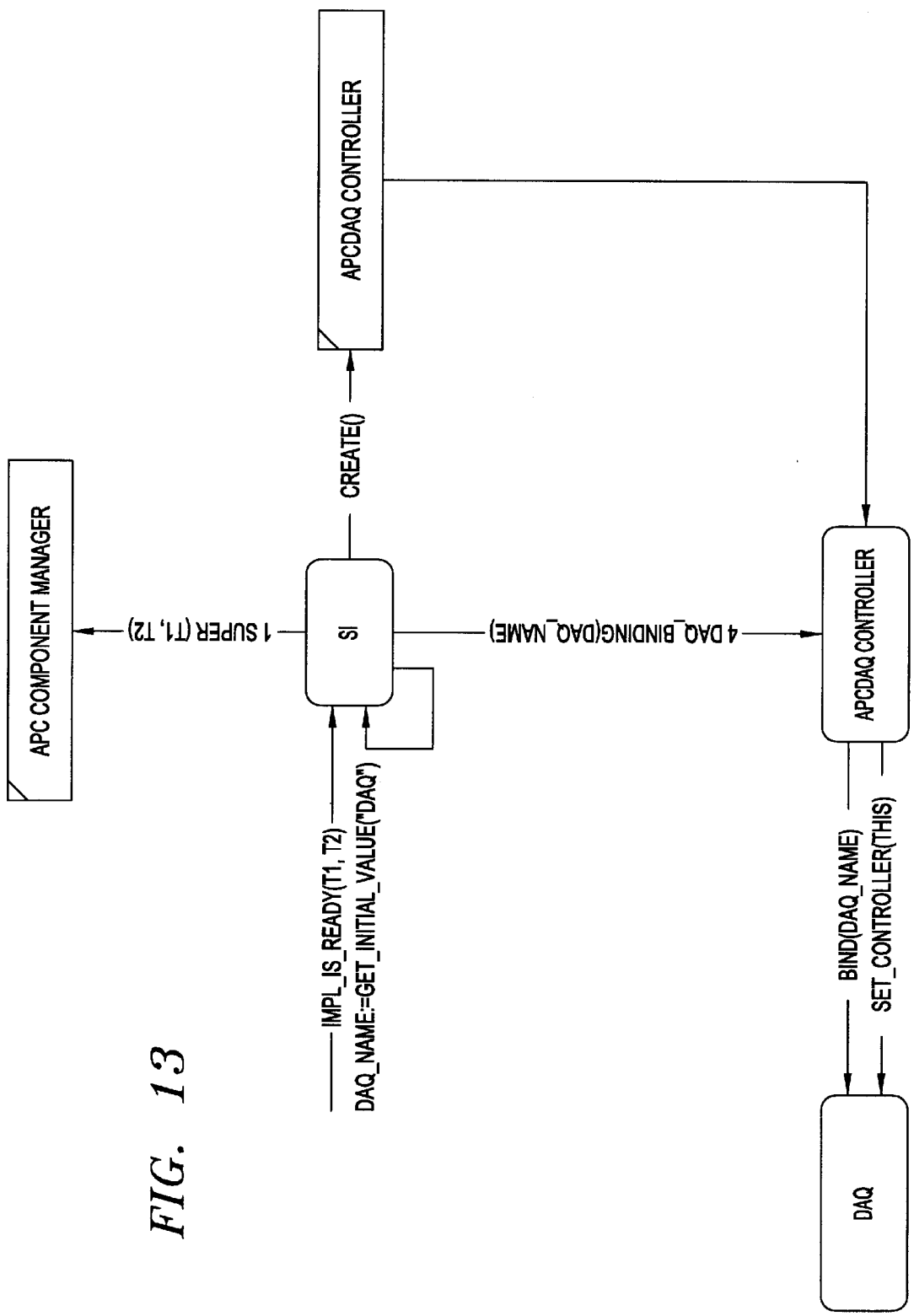
FIG. 13 is an object collaboration diagram showing an embodiment of the AddOnSensor Initialization class.
Figure 14:
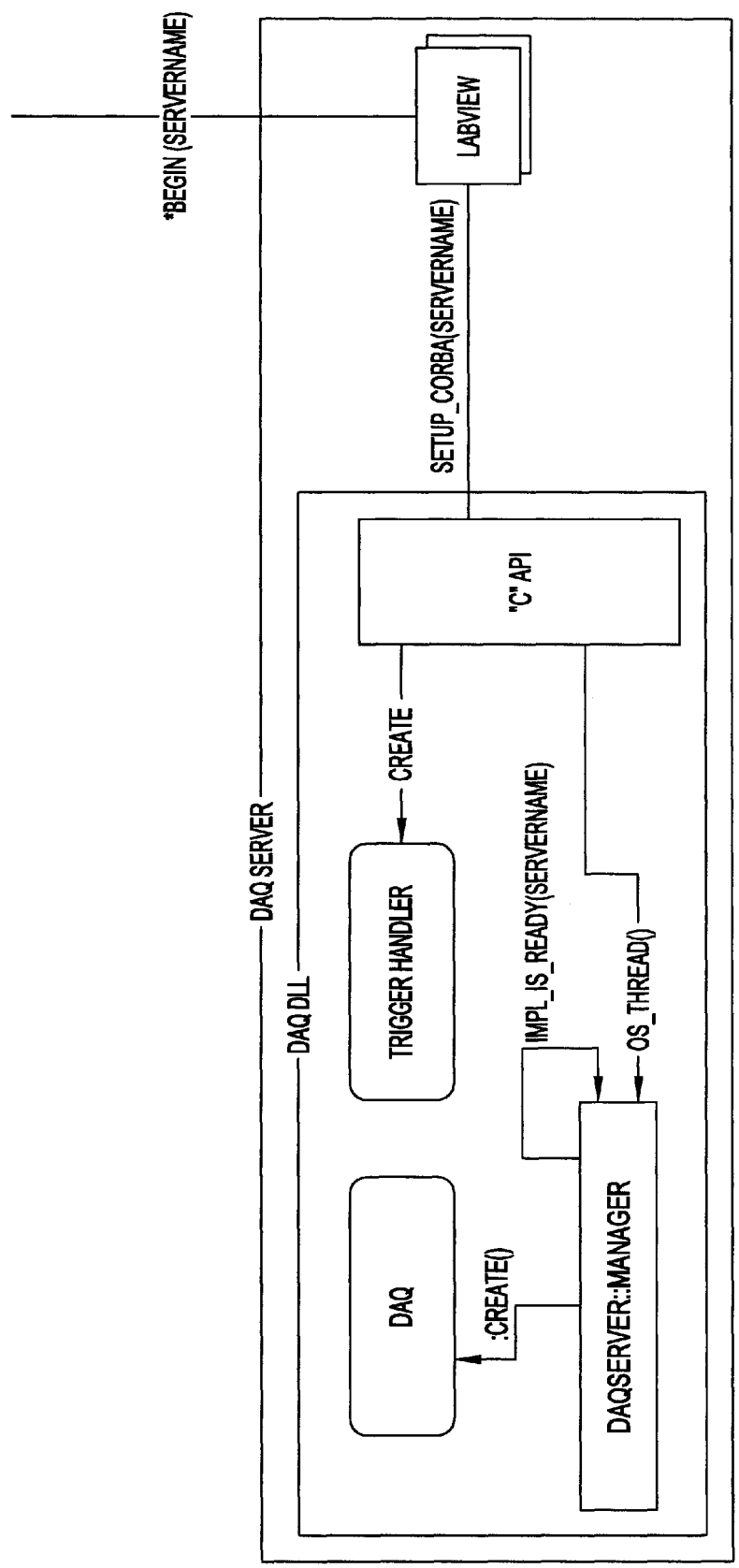
FIG. 14 is a collaboration diagram showing an embodiment of the communication layer (DAQ) Initialization.
Figure 15:
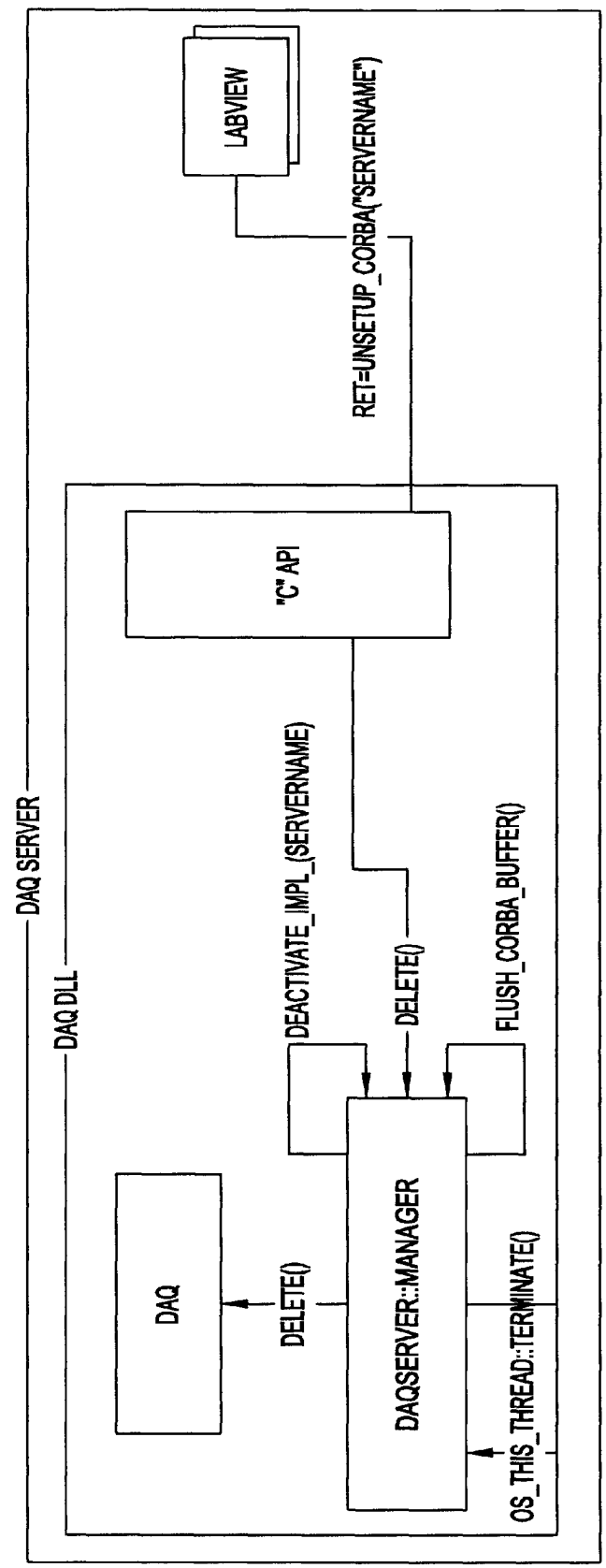
FIG. 15 is a collaboration diagram showing an embodiment of the communication layer (DAQ) Clean Up.
Figure 16:
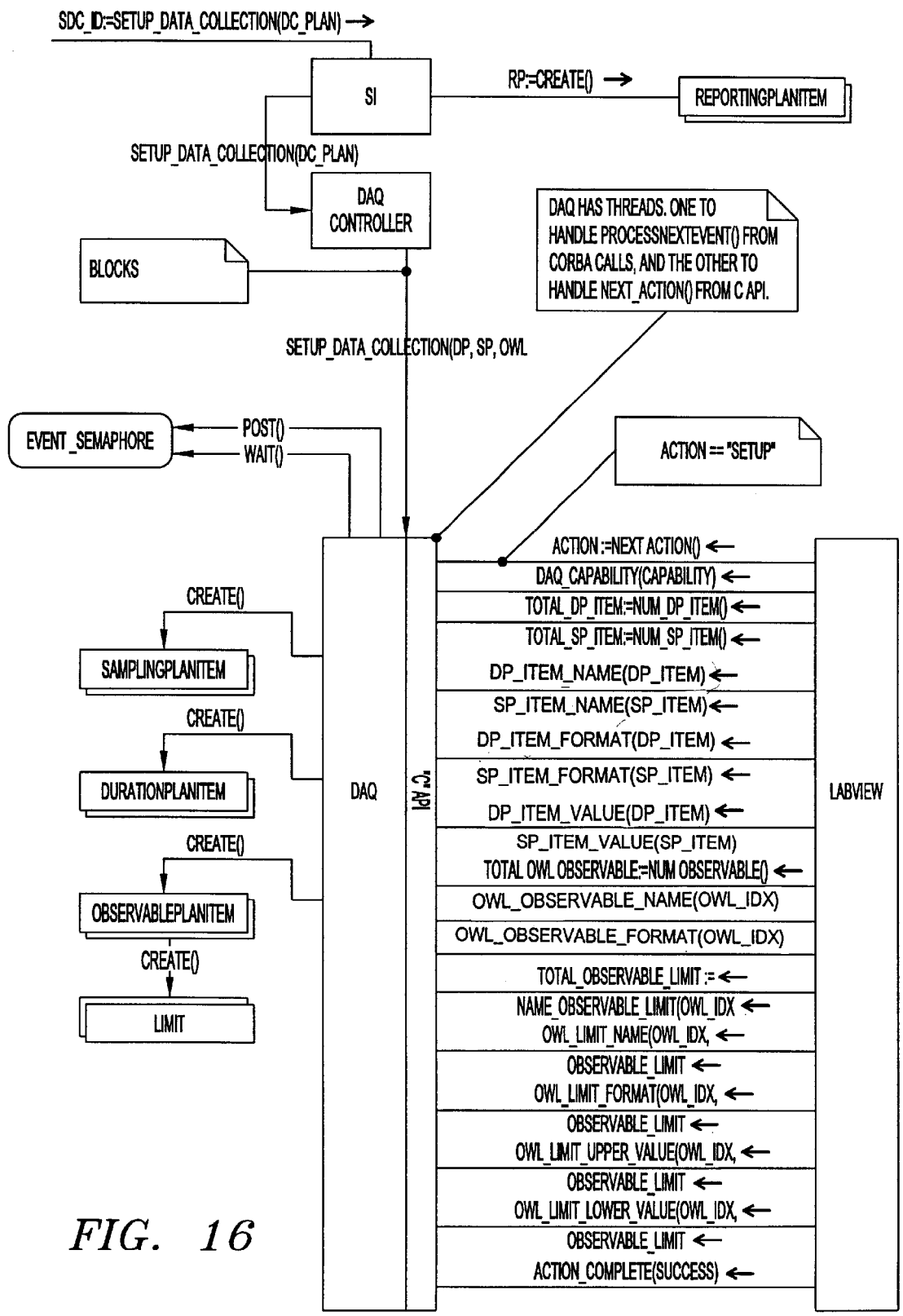
FIG. 16 is a schematic block diagram showing a process for performing a setup of data collection in the APC.
Figure 17:
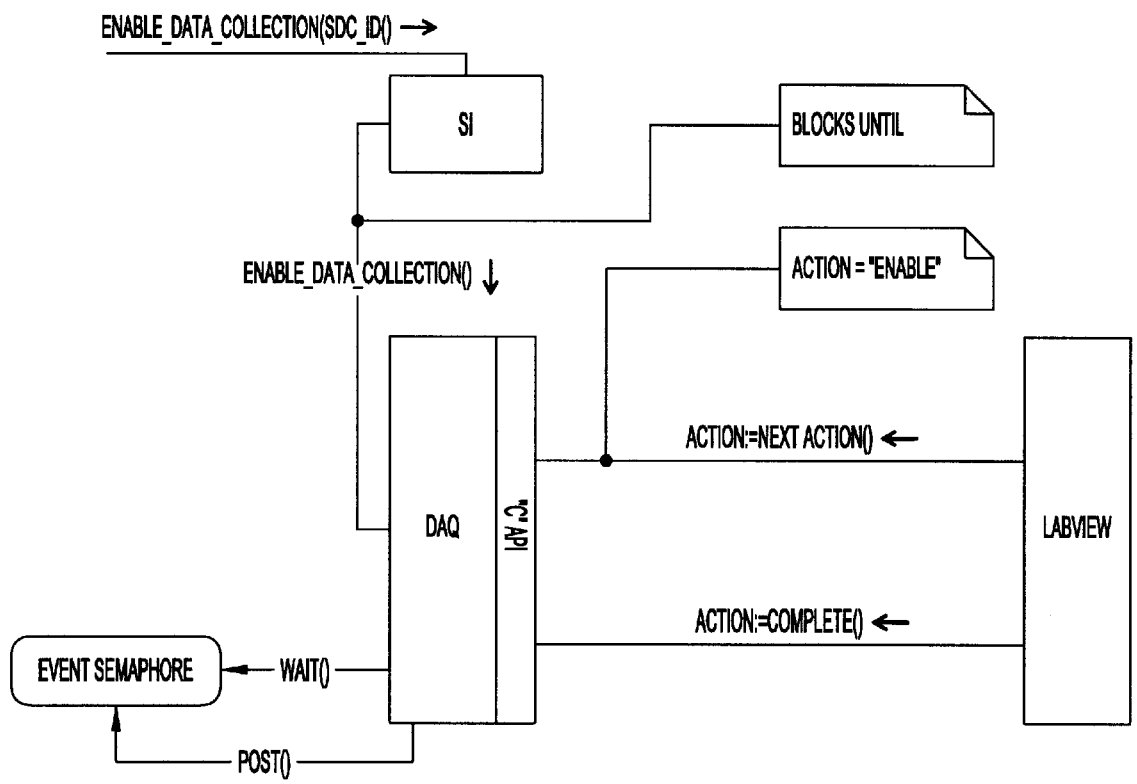
FIG. 17 is a schematic block diagram showing a process for performing enabling of data collection in the APC.
Figure 18:
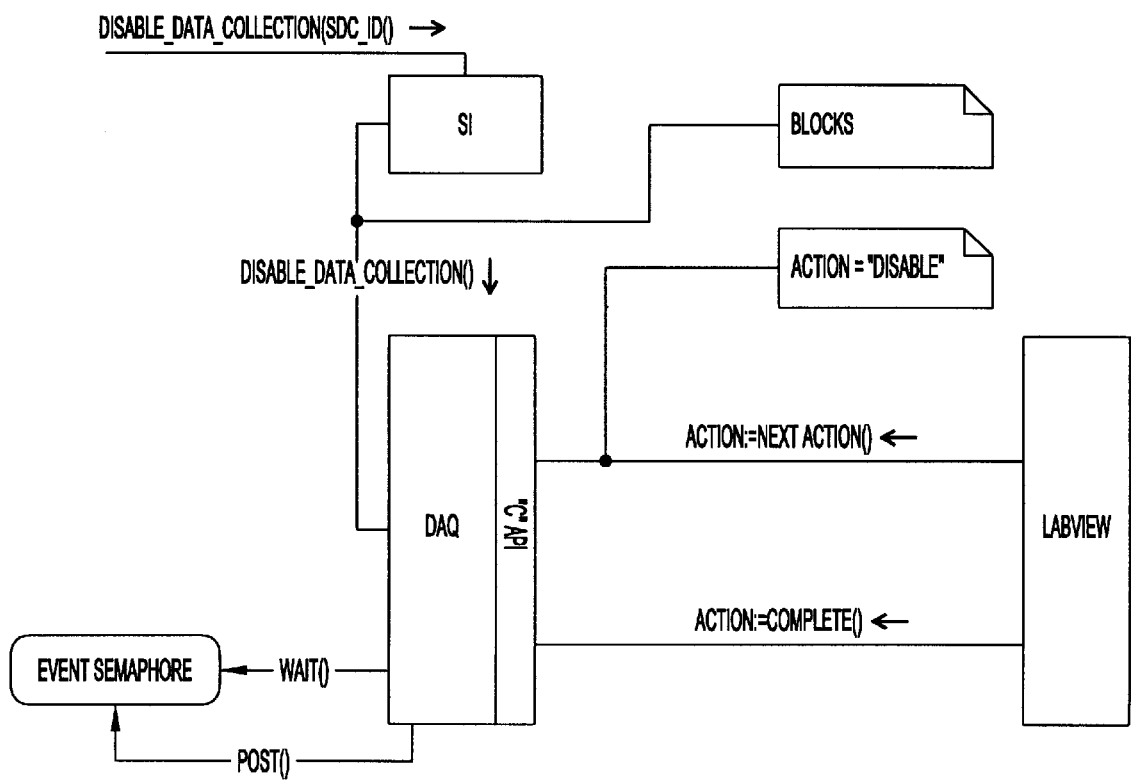
FIG. 18 is a schematic block diagram showing a process for performing disabling of data collection in the APC.
Figure 19:
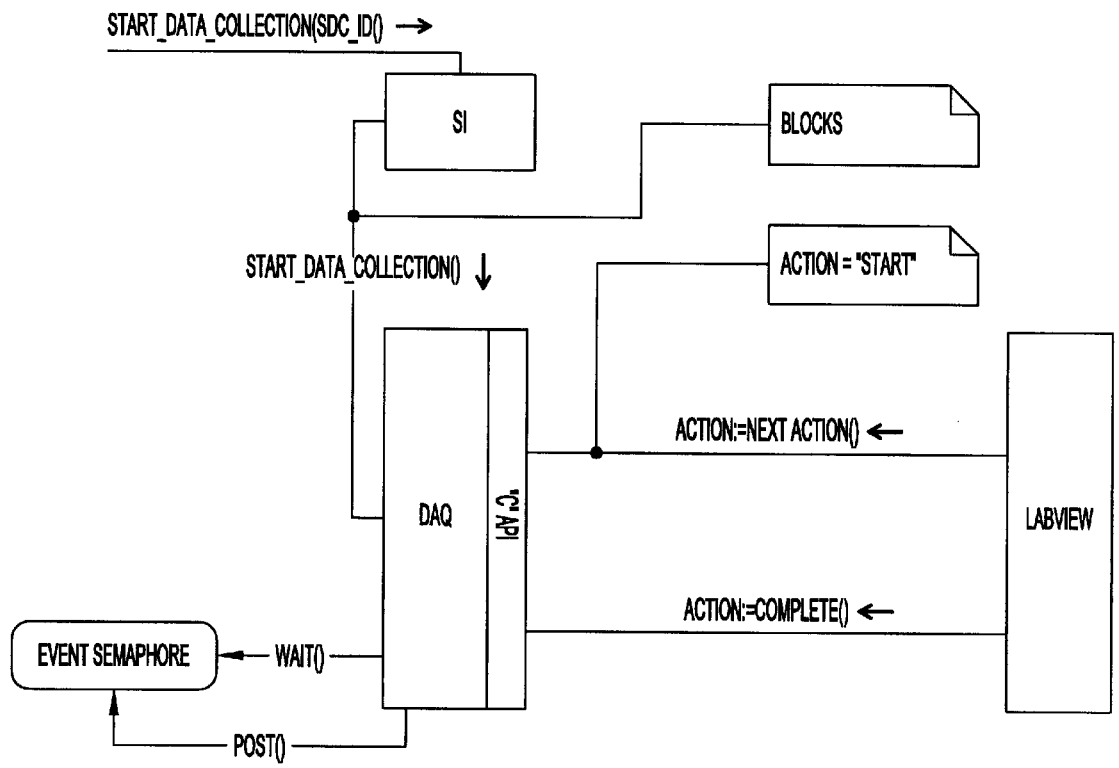
FIG. 19 is a schematic block diagram showing a process for starting data collection in the APC.
Figure 20:
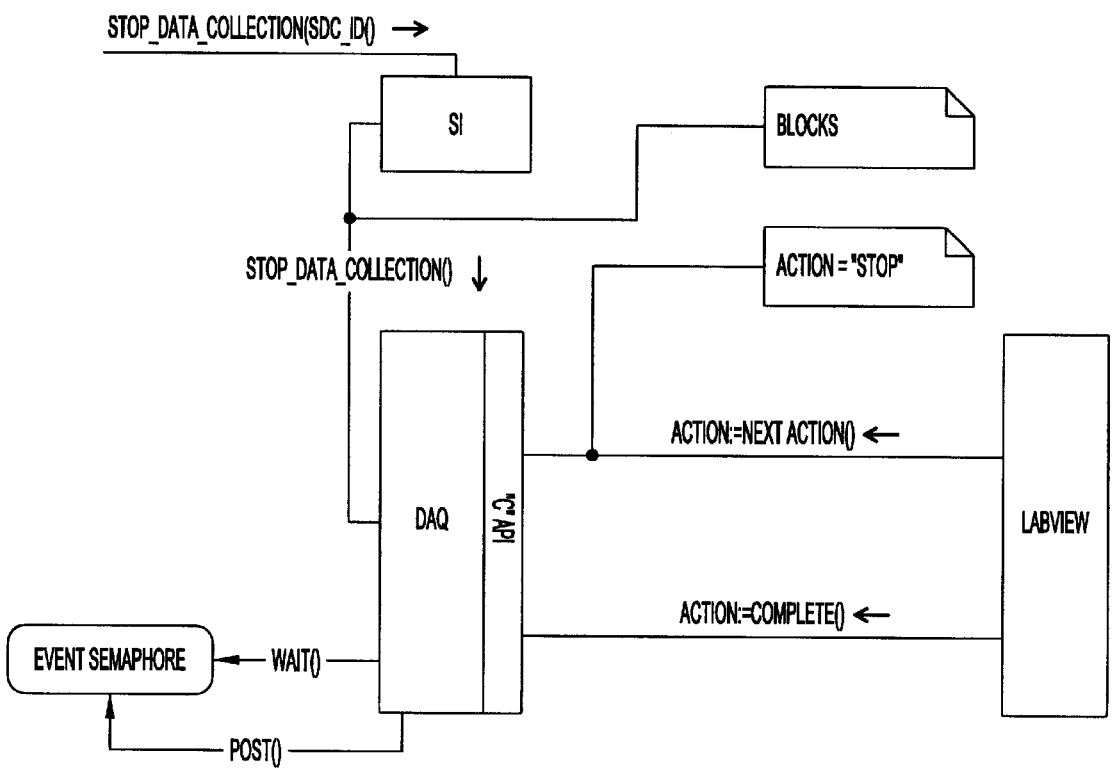
FIG. 20 is a schematic block diagram showing a process for stopping data collection in the APC.
Figure 21:
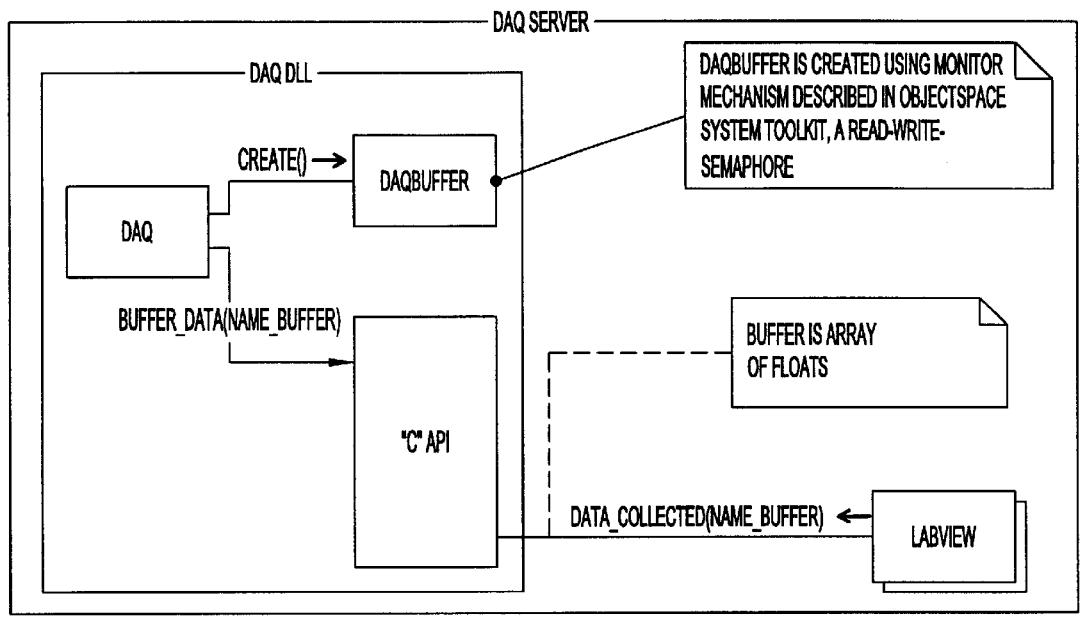
FIG. 21 is a schematic block diagram showing a process for performing data collection buffering in the APC.
Figure 22:
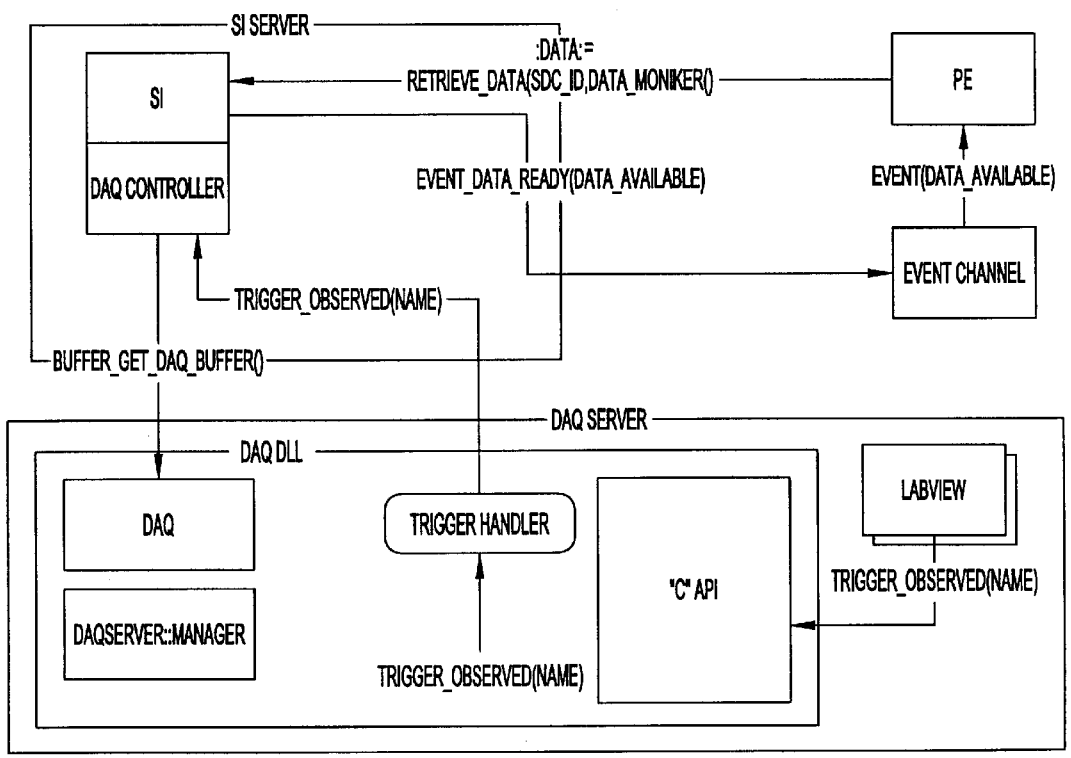
FIG. 22 is a schematic block diagram showing a process for performing data collection triggering in the APC.
Figure 23:
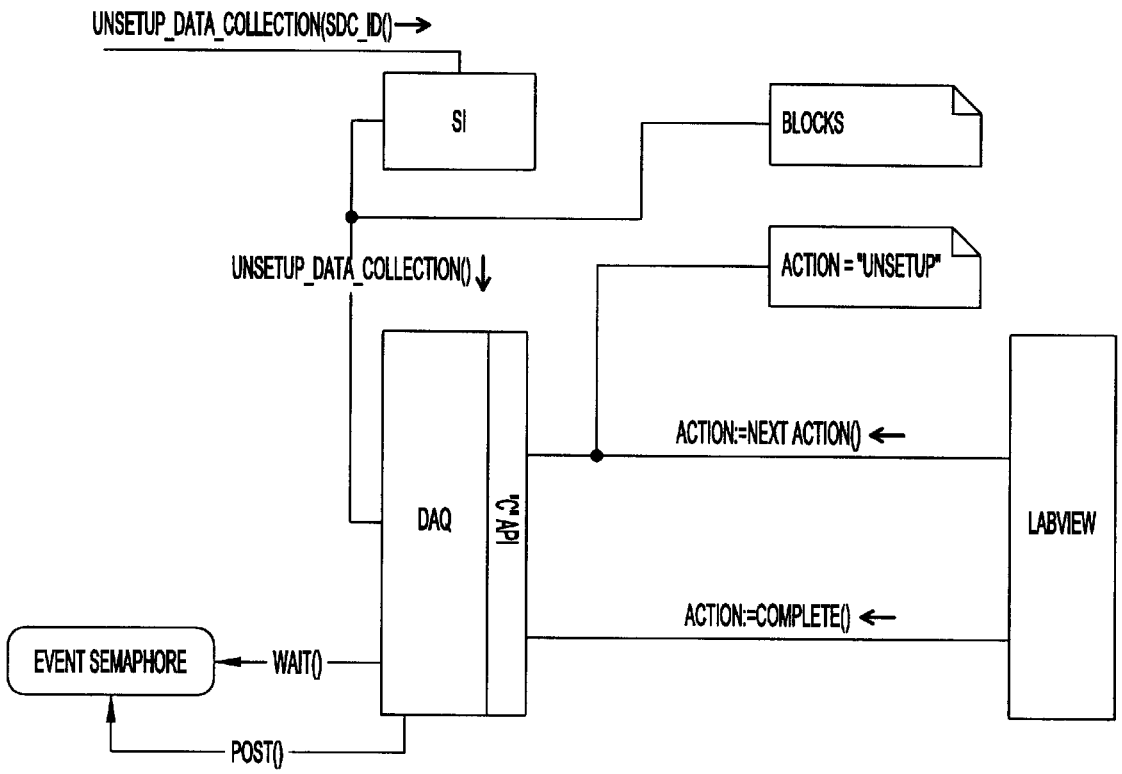
FIG. 23 is a schematic block diagram showing a process for performing an unsetup of data collection in the APC.

Referring to FIG. 12, a class diagram shows an embodiment of the communication layer DAQ class. FIG. 13 through 15 are object collaboration diagrams showing various aspects of communication layer (DAQ) operation.

Referring to FIG. 16 through FIG. 23, a plurality of schematic block diagrams show various aspects of data collection in the ACP.

AddOnSensor Class and Operation Specifications are described as follows.

The AddOnSensor (SI) Class is inherited from classes APCTypes_CapabilityProvider, APCComponent_BaseManager, and APCDCInterfaces_DataCollector.

Attribute: sensor_id :string

Responsibilities: denotes the identification string one would use to communicate with SI. The identification string is issued as a return result to setup_data_collection ( ) call.

Attribute: capability :string

Responsibilities: describes the type of external sensor (DAQ) SI is communicating to, on behalf of other APC components.

Attribute: buffer_seq :APCRunData: :RunDataSequence

Responsibilities: stores the data collected by the external sensor.

A Class DAQController is described as follows:

Operation: trigger_observed

Responsibilities: Informs the DAQ controller when DAQ observed a trigger described in the Data Collection Plan.

Parameters: trigger_name :string

Return Value: None

Preconditions: DAQ Controller invoked setup_data_collection method on DAQ

Exceptions: SystemException

A Class SIReportingPlan is described as follows:

Attribute: num_item long

Responsibilities: denotes the number of sequence items in the reporting plan.

Attribute: rp :APCDataCollection::ReportingPlan

Responsibilities: The reporting plan data structure.

Operation: num_rp_item

Responsibilities: returns the number of items in the reporting plan data structure.

Parameters: None

Return Value: long

Preconditions: SI is properly setup.

Exceptions: SystemException

Operation: rp_item_name

Responsibilities: returns the name of an item in the reporting plan data structure.

Parameters: item_idx :long

Return Value: string

Preconditions: SI is properly setup.

Exceptions: SystemException

Operation: rp_item_format

Responsibilities: returns the format (data type) of an item in the reporting plan data structure.

Parameters: item_idx :long

Return Value: ItemFormat

Preconditions: SI is properly setup.

Exceptions: SystemException

Operation: rp_item_value

Responsibilities: returns the value of an item in the reporting plan data structure.

Parameters: item_idx :long

Return Value: depends on the item format.

Preconditions: SI is properly setup.

Exceptions: SystemException

The communication layer (DAQ) Class and DAQ Operation Specifications are, as follows:

Attribute: capability :string

Responsibilities: describes the type of external sensor DAQ is providing the CORBA communication layer for.

Operation: setup_data_collection

Responsibilities: allows the SI to initiate the set up process at the external sensor.

Parameters: dp :DurationPlan, sp :Samplin_ian, owl :ObservablewithLimitsSequence Return Value: capability :string Preconditions: Set up has not been performed before.

Exceptions: SystemException

Operation: enable_data_collection

Responsibilities: allows the SI to enable the data collection process at the external sensor.

Parameters: None

Return Value: None

Preconditions: Set up has been performed.

Exceptions: SystemException

Operation: disable_data_collection

Responsibilities: allows the SI to disable the data collection process at the external sensor.

Parameters: None

Return Value: None

Preconditions: Set up has been performed.

Exceptions: SystemException

Operation: start_data_collection

Responsibilities: allows the SI to start the data collection process at the external sensor.

Parameters: None

Return Value: None
Preconditions: Set up has been performed.
Exceptions: SystemException Operation: stop_data_collection
Responsibilities: allows the SI to stop the data collection process at the external sensor.
Parameters: None
Return Value: None
Preconditions: Set up has been performed.
Exceptions: SystemException Operation: unsetup_data_collection
Responsibilities: allows the SI to Un-set up data collection configuration at the external sensor, clean up is performed.
Parameters: None
Return Value: None
Preconditions: Set up has been performed.
Exceptions: SystemException Operation: get_daq_buffer
Responsibilities: allows DAQ controller to retrieve data collected since the same method was called.
Parameters: None
Return Value: DaqBufferSeq
Preconditions: Set up has been performed.
Exceptions: SystemException Operation: daq_capability
Responsibilities: allows the external sensor to inform DAQ about it's data acquisition capability.
Parameters: capability string
Return Value: None
Preconditions: None Operation: num_dp_item
Responsibilities: returns the number of items in the duration plan data structure.
Parameters: None
Return Value: long
Preconditions: set up process started.

Operation: dp_item_name
Responsibilities: returns the name of an item in the duration plan data structure.
Parameters: item_idx :long
Return Value: string
Preconditions: set up process started.

Operation: dp_item_format
Responsibilities: returns the format of an item in the duration plan data structure.
Parameters: item_idx :long
Return Value: string
Preconditions: set up process started.
Operation: dp_item_value
Responsibilities: returns the value of an item in the duration plan data structure.
Parameters: item_idx long
Return Value: string
Preconditions: set up process started.

Operation: num_sp_item
Responsibilities: returns the number of items in the sampling plan data structure.
Parameters: None
Return Value: long
Preconditions: set up process started.

Operation: spjtem_name
Responsibilities: returns the name of an item in the sampling plan data structure.
Parameters: item_idx :long
Return Value: string
Preconditions: set up process started.

Operation: spjtem_format
Responsibilities: returns the format of an item in the sampling plan data structure.
Parameters: item_idx :long
Return Value: string
Preconditions: set up process started.

Operation: spjtem_value
Responsibilities: returns the value of an item in the sampling plan data structure.
Parameters: item_idx :long
Return Value: string
Preconditions: set up process started.

Operation: num_observable
Responsibilities: returns the number of observable in the ObservableLimitsSequence
data structure.
Parameters: None
Return Value: long
Preconditions: set up process started.

Operation: observable_name
Responsibilities: returns the name of an observable in the ObservableLimitsSequence data structure.
Parameters: obs_idx :long
Return Value: string
Preconditions: set up process started.

Operation: observable_format
Responsibilities: returns the format of an observable in the ObservableLimitsSequence data structure.
Parameters: obs_idx long
Return Value: ObservableFormat
Preconditions: set up process started.

Operation: num_observable_limit
Responsibilities: returns the number of limits in an observable, in the ObservableLimitsSequence data structure.
Parameters: obs_idx :long
Return Value: long
Preconditions: set up process started.

Operation: limit_name
Responsibilities: returns the name of a limit in an observable, in the
ObservableLimitsSequence data structure.
Parameters: obs_idx :long, limiLidx :long
Return Value: string
Preconditions: set up process started.

Operation: limit_format
Responsibilities: returns the format of a limit in an observable, in the
ObservableLimitsSequence data structure.
Parameters: obs_idx :long_limiLidx :long
Return Value: LimitFormat
Preconditions: set up process started.

Operation: limit_upper_value
Responsibilities: returns the upper value of a limit in an observable, in the
ObservableLimitsSequence data structure.
Parameters: obs_idx :long, limiLidx :long
Return Value: depends on the limit format
Preconditions: set up process started.

Operation: limit_lower_value
Responsibilities: returns the lower value of a limit in an observable, in the
ObservableLimitsSequence data structure.
Parameters: obs_jdx :long, limiLidx :long
Return Value: depends on the limit format
Preconditions: set up process started.

Operation: daq_setup_complete
Responsibilities: allows the external sensor to inform DAQ the success or failure of the set up process.
Parameters: success boolean
Return Value: None
Preconditions: Set up process has started.

Operation: next_action
Responsibilities: allows the DAQ to relay messages from SI to external sensor. This is required only when external sensor does not provide callback capability.
Parameters: None
Return Value: string
Preconditions: Set up process was successful.

A Data Collector IDL is described as follows:

```
#ifndef _APCDCInterfaces_idl_
#define _APCDCInterfaces_idl_
#include<APCDataCollection.idl>
#include<APCRunData.idl>
// The APCDCInterfaces module defines the interface of a Data Collector
module APCDCInterfaces {
//    The DataCollector interface is an abstract interface that is mixed
//    with other interfaces to form a concrete interface. The concrete
//    interface defines the state machine and state attributes for itself
//    and the DataCollector. Its operations raise a system exception if
//    the manager isn't running.
typedef string DataCollectorId;
typedef string DataMoniker;
exception InvalidDCPlan
{
string message;
};
exception DCSetupFailed
{
string message;
};
exception DCUnsetupFailed
{
string message;
};
exception InvalidDCId
{
string message;
};
exception InvalidDCParams
{
string message;
};
exception DCStartFailed
{
string message;
};
exception DCStopFailed
{
string message;
};
exception DCEnableFailed
{
string message;
};
exception DCDisableFailed
{
string message;
};
exception InvalidMoniker
{
string message;
};
exception RetrieveDataFailed
{
string message;
};
interface DataCollector
{
DataCollectorId setup_data_collection(
        in APCDataCollection::DCPlan dc_plan
    ) raises (
        InvalidDCPlan,
        DCSetupFailed,
        APCTypes::SystemException
    );
void unsetup_data_collection (
        in DataCollectorId dc_id
    ) raises (
        InvalidDCId,
        DCUnsetupFailed,
        APCTypes::SystemException
void enable_data_collection(
        in DataCollectorId dc_id
    ) raises (
        InvalidDCId,
        DCEnableFailed,
        APCTypes::SystemException
void disable_data_collection (
        in DataCollectorId dc_id
    ) raises (
        InvalidDCId,
```

-continued

```
            DCDisableFailed,
            APCTypes::SystemException
        );
void start_data_collection (
            in DataCollectorId dc_id
        ) raises (
            InvalidDCId,
            DCStartFailed,
            APCTypes::SystemException
        );
void stop_data_collection (
            in DataCollectorId dc_id
        ) raises (
            InvalidDCId,
            DCStopFailed,
            APCTypes::SystemException
        );
APCRunData::RunDataSequence retrieve_data (
            in DataCollectorId dc_id
            in DataMoniker moniker
        ) raises (
            InvalidDCId,
            InvalidMoniker,
            RetrieveDataFailed,
            APCTypes::SystemException
        );
    };
};
#endif
```

A Data Collector Events IDL is described as follows:

```
#ifndef_APCDCEvents_idl_
#define_APCDCEvents_idl_
#include<APCRunData.idl>
#include<APCDCInterfaces.idl>
module APCDCEvents
{
struct DataAvailable
 {
 APCDCInterfaces::DataCollectorId id;
 APCDCInterfaces::DataMoniker moniker;
 APCRunData::RunDataSequencedata;
 };
interface DCPushConsumer: CosEventComm::PushConsumer
  {
  oneway void data_available
  (
  in APCDCInterfaces::DataCollectorId id,
  in APCDCInterfaces::DataMoniker moniker,
  in APCRunData::RuriDataSequence data
  };
 };
interface DCProxyPushConsumer:
CosEventChannelAdmin::ProxyPushConsumer
 {
 oneway void data_available
 (
 in APCDCInterfaces::DataCollectorId id,
 in APCDCInterfaces::DataMoniker moniker,
 in APCRunData::RunDataSequence data
 );
 };
};
#endif
An AddOnSensor Interface IDL is described, as follows:
    #ifndef_APCAddOnsensor_idl_
    #define_APCAddOnSensor_idl_
    #include<APCDCInterfaces.idl>
    #include<APCRunData.idl>
    // The AddOnSensor interface . . .
    interface APCAddOnSensor
    APCComponent::BaseManager,
    APCTypes::CapabilityProvider,
    APCDCInterfaces::DataCollector
    {
    };
#endif
A DAQ Controller IDL is described as follows:
    #ifndef_APCDAQController_idl_
    #define_APCDAQController_idl_
    #include<APCRunData.idl>
    // The AddOnSensor interface . . .
    interface APCDAQController
    {
    void trigger_observed
    (
        in string trigger_name
    ) raises
    (
        APCTypes::SystemException
    );
    };
#endif
A DAQIDL is described, as follows:
    #ifndef_APCDataAcquisition_idl_
    #define_APCDataAcquisition_idl_
    #include<APCTypes.idl>
    #include<APCDataCollection.idl>
    #include<APCDAQController.idl>
    //   The DAQ interface . . .
    module APCDataAcquistion
    {
    typedef sequence<float> SensorData;
    struct DaqBuffer
        {
        string name;
        SensorData data_seq;
        APCTypes::Timestamp time_stamp;
        };
    typedef sequence<DaqBuffer > DaqBufferSeq;
    typedef string Capability;
    interface DataAcquisition
    {
    Capability setup_data_collection
        (
        in APCDataCollection::DurationPlan dp,
        in APCDataCollection::SamplingPlan sp,
        in APCDataCollection::ObservableWithLimitsSequence owl
        ) raises
            (
            APCTypes::SystemException
    void unsetup_data_collection
        (
        ) raises
            (
            APCTypes::SystemException
            );
    void start_data_collection
        (
        ) raises
            (
            APCTypes::SystemException
            );
    void stop_data_collection
        (
        ) raises
            (
            APCTypes::SystemException
            );
    void enable_data_collection
        (
        ) raises
            (
            APCTypes::SystemException
            );
    void disable_data_collection
        (
        ) raises
            (
            APCTypes::SystemException
            );
    void set_controller
        (
```

-continued

```
            in APCDAQController controller
        ) raises
            (
            APCTypes::SystemException
            );
        DaqBufferSeq get_daq_buffer
            (
            ) raises
            (
            APCTypes::System_xception
            );
        };
    };
#endif
```

A first task in the testing of distributed CORBA-based systems is a selection of a suitable set of tests. One option is the selection of a single test that tests all components. A more suitable approach is to identify a series of tests beginning with simple tests that exercise a small number of interfaces or components. Additional tests exercise combinations of components and interfaces until the entire system is tested.

Initial tests most advantageously test interactions that involve only a few components such as tests of components that operate solely as servers and, thus, make no calls to other components. Even components that do not interact with other components involve some complexity since multiple aspects are tested to determine correct operational scenarios, and to detect operations out of sequence, state-based tests, bad parameter values, and so on. A single test case is made up of multiple testing scenarios.

Another technique for determining suitable tests of low complexity interactions includes an analysis of a small set of interfaces that are common across a large number of components. For example, all components may provide a common infrastructure to activate component logging, log incoming requests and replies to a central server, and deactivate logging. An implementation of logging interfaces may be deployed in several components and tested against the logging service.

A further technique involves writing of a test case with both normal and abnormal scenarios. An example of an abnormal scenario is a logging test in which the logger fails. A driver program is written to connect to the components and call a common logging interface of the components. After running the test, all components in the system support logging and provide a solid foundation from which to run other tests, since tracing and timing information remain available in the log.

Still another test determination technique involves selection of services that are used by several components in common. One example is selection of an event service, a naming service, a trader, or a registry service. Testing of the interactions between the components and the services is specified early in the process so that early identification of interactions and data values eliminates uncertainty in the design and results in a system that is more likely to meet specifications.

Another test determination technique involves selection of use cases. A scenario is selected for each of the user-initiated events that result in the client sending out remote messages. The tests typically involve several components such as a client, any primary components with which the client interacts, any secondary components with which the primary components interact, and so on. If the client accepts input from the keyboard or mouse, testing tools may be used to record and play back the user inputs to stress test the system for extended periods. Stress tests are useful but utilize a minimum of tracing information to determine what the servers are doing with the request once the request leaves the client.

A further set of interactions to be specified in a test is an end-to-end test that exercises the entire system. In planning the end-to-end test, a tested with a harness for each of the components that participate in the test is used. Without the testbed, an end-to-end test cannot be performed until all components are developed. The testbed advantageously allows a component to be tested as soon as the component becomes available.

Figure 24:
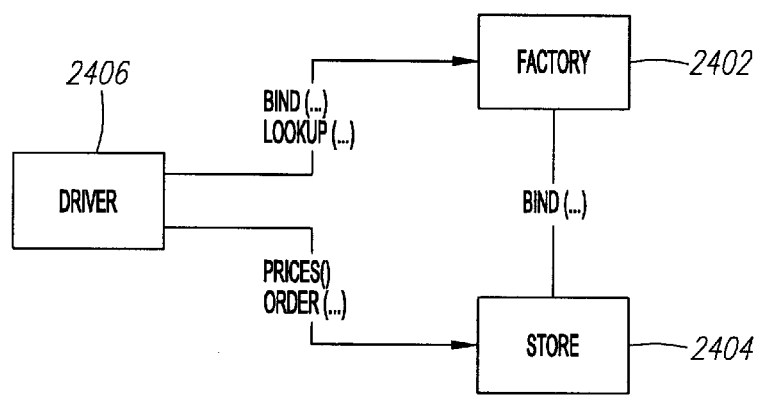
FIG. 24 is a schematic block diagram illustrates an UML collaboration diagram.

Referring to FIG. 24, a schematic block diagram illustrates an UML collaboration diagram. Collaboration diagrams are diagrammatic tools for analyzing test cases. UML collaboration diagrams specify scenarios that make up a test case and identify the sequencing of interactions among components. Data handled in the UML collaboration diagrams include information for starting and stopping the components in the test, initializing the components' internal state, and identifying the expected inputs and outputs from the test. The information is used to generate harnesses for a specific test scenario, set up a test, and determine whether the test is successful.

Nodes in collaboration diagrams represent components that service incoming requests. The components operate as black boxes that hide internal classes. For integration testing, interactions among internal classes are unimportant and therefore not tested. Interactions among components that are tested. Prior to servicing a request, a component are initialized by possibly creating one or more objects, acquiring references to other objects, and registering with an Object Request Broker (ORB). An initialization section is included with the collaboration diagrams to control component initialization. A component that does not include an initialization section creates objects for each bind request that is received and registers, by component name, with the ORB.

The edges in the UML collaboration diagram identify sequences of interactions and the values that flow from the interactions. The values are encoded using a notation such as an OMG externalization service that is used to represent all OMG data types and exceptions. Many data types and references have a logical and simple encoding that is consistently defined and available at a set-up or initialization time, prior to run-time. Unfortunately, other data types include vendor-specific, opaque data that is confusing and only determined at runtime. An obscure, difficult-to-understand encoding does not create problems if components always return references to a local object. For example, in a simple case, an encoding can specify an expected data type and a returning harness simply creates and returns an object of that type. Unfortunately, the simple case is not always followed. Some systems specify that a component return a reference to an object in another different component. The return of a reference to a different component is allowed by encoding object references using a variable name of the form IOR:<object-id> that has an initialization specified by the test scenario.

FIG. 24 represents an "Order Item" testing scenario that uses a factory 2402 to look up an object and apply methods to the object. The example uses a retail store object 2404. The test scenario orders an item from the store 2404. To run the test the retail store object 2404 and the factory 2402 are registered with the ORB. Then the retail store object 2404, the factory 2402, and a driver 2406 are started in a console window.

To stop the test, the retail store object 2404 and the factory 2402 are stopped and then uninstalled from the ORB. Documentation of the illustrative test scenario includes data structures, as follows:

1. Factory::bind
   Format: Factory_ptr bind(string)
   Request: {":Factory"}
   Reply: {IOR:factory}

2. Factory::lookup
   Format: Store_ptr lookup(string)
   Request: {":Sears"}
   Reply: {IOR:sears}

2.1. Store::bind
   Format: Store_ptr bind(string)
   Request: {":Sears"}
   Reply: {IOR:sears}

3. Store::prices
   Format: PriceSeq prices( )
   Request: {}
   Reply: {#({"Item_1", 12.99},{"Item_2", 5.99}

4 Store::order
   Format: void order(Item)
   Request: {"Item_1", 12.99,3 }}
   Reply: {}

Problems that span components are detected by reviewing the collaboration diagrams with developers of the components that participate in this test scenario. For example, if components are not threaded and the collaboration diagram shows a loop back to one of the previous components, a deadlock is detected and is repaired before developers write development code.

If a collaboration diagram shows repeated calls from one component to access different data values in the same object, the different data values are encapsulated in a structure and retrieved in a single call. Performance is improved because the number of messages flowing over the network are reduced. If interactions involve a transfer of large amounts of data, performance is improved by encapsulating the data inside an interface and retrieved in chunks rather than all at once. Another option is to pass the name of a file back to the client and let the client use a distributed file system to access the values in the file. Problems, including the illustrative problems and other problems, are efficiently corrected by beginning a process by identifying, specifying, and reviewing test scenarios.

Integration testing includes testing of each scenario of many in sequence until all are tested. Integration testing selectively proceeds from the top down, the bottom up, or a combination.

Top-down testing uses harnesses to test interactions between components in a test scenario. In top-down testing, all the system interactions are tested using harnesses without waiting for implemented components. A component is tested with harnesses when available. The harnesses surround the component under test, so that a component that interacts with other components receives expected results.

Bottom-up testing begins by testing lower-level components, then using lower-level test results to test the higher-level components in a sequence among increasingly higher-level components. Bottom-up testing is preferred for components that are not dependent on other components. A single test program suffices to test independent components. Bottom-up testing reduces implementation of the harnesses for testing alone, since the tested components are used instead of harnesses. If development is staggered so that components become available in time to test components that use the available components, bottom-up testing eliminates a effort expended in developing the harness. Typically, both top-down and bottom-up testing are used.

Execution of an operation is altered by the occurrence of an exception. Before beginning the operation, the exceptions that affect an operation are specified in an "OMG IDL raises" clause. If exceptions are not specified, only OMG standard system exceptions are raised. Rather than relying on system exceptions, exception specifications are advantageously defined even for exceptions that directly correspond to an OMG system exception. Since the Object Request Broker (ORB) can produce system exceptions, if the operation also produces system exceptions then a client process cannot reliably determine the source of a system exception.

Some exceptions are reasonably anticipated although anticipation of all exceptions that different operation implementations generate is difficult or impossible. For example, one can reasonably expect that if an account number is passed into the operation, a corresponding account may not exist so that specification of a NoAccountWithSpecifiedNumber exception is warranted. In contrast, exceptions such as running out of memory, the ability to communicate with another server, or the inability to open the persistent store are difficult to anticipate and are somewhat implementation-dependent.

The OMG IDL for a system exception is:
   module Exceptions
   {
   // Enums for the OMGs major codes.
   enum MajorCode{mc_UNKNOWN, mc_BAD_PARAM, . . . ,
      mc_OBJECT_NOT_EXIST };
   // system exception
   exception SystemException(MajorCode major_code;
      string error_message;};
   };

A guideline for user-defined exceptions includes two aspects: (1) specification of user exceptions (if any) that are anticipated based on the signature of the operation, and (2) a mandatory specification of one catchall exception for the error conditions that are implementation-dependent or cannot be anticipated. The guideline has several advantages. First, by defining user exceptions for anticipated exceptions, additional information is conveyed in the exception, and the exception is easily caught and handled. Second, by defining an all-encompassing system exception, unanticipated exceptions are raised without redefining the IDL. Furthermore, exceptions raised by an exception are differentiated from the ORB system exceptions.

For example, instead of generating the BAD_PARAM system exception to indicate that the application received an invalid parameter, an operation is configured to generate an Exceptions::SystemException, a user exception that contains the same information as the CORBA exception. The Exceptions::SystemException indicates that a bad parameter was passed and includes a message to identify the problem and some possible corrections. Message information associated to an exception is most advantageously supplied using a local file, possibly using an implementation-dependent minor code as a key into the file.

IDL attributes are most advantageously defined through the usage of operations rather than by directly defining the attributes since attributes are mapped into an operation in the programming language, but the operation cannot raise any user-defined exceptions. The implementation of the operation may be overridden but the generation of a user-defined exception is not valid. For example, if one attempts to set an attribute to an invalid value, the operation generated for an attribute is disadvantageously limited to raise only system exceptions. A better course is define an accessor operation instead of a read-only attribute, and define an accessor and a mutator instead of an attribute.

When creating a new IDL data type, a sequence for the type is most advantageously defined, particularly when new interfaces and top-level structs or unions are defined. Defining a sequence enables the later definition of operation, possibly in other modules, to return a sequence of the defined types. Failure to define a sequence for a type leads to a high probability that IDL changes will be required at a later time.

The OMG standard C++ mapping defines an alternative mapping for modules. Typically, modules are mapped to namespaces or classes so that the types contained in a module are referenced using a "::" notation. For example, if module "Outer" contains a type called "Inner", the code would reference "Outer::Inner." However if the compiler does not support namespaces or nested types, the mapping of modules would use an underscore ("_") notation and the code would be changed to reference all occurrences of the type with "Outer_Inner." Porting the code to different platforms in this case is therefore time-consuming and susceptible to error. To avoid the problem, macros are define that insert the "::" or the "_" between the module and type names. The macros are called when nested types are found. Enumeration literals have a similar problem. Some are nested in the name space (or class), and the alternative mapping defines enumeration literals at global scope.

Instead of storing internal data members as native CORBA types; higher level abstractions such as those found in the Standard Template Library are used for storing and manipulating internal data values. The reason for using higher level abstractions is that the internal data values are to be kept in storage with a copy of the data passed to the Object Request Broker (ORB) upon a request by a client process. Copies of the data are to be made in any case so that little or no overhead is expended in copying the CORBA values into and out of higher level objects. The higher level objects are accessed and manipulated more easily using the higher level abstractions than by manipulating a native CORBA sequence.

Memory-management rules are applied when developing distributed applications using C++. The component manager approach advantageously results in tighter control of core codes. A memory-management analysis tool, called "Purify" performs a strict adherent-to-memory "cleansing" to detect potential memory conflicts and problems such as dangling pointers and unfreed memory in all our components. The Purify tool identifies leaks in libraries or other code beyond the control of the application writers.

In the illustrative embodiment of the APC, applications are supported cross-platform including support of HP/UX and Windows NT platforms. Cross-platform development problems are avoided by selecting tools that support cross-platform use initially. Tools selection is restricted based on the platforms supported by the tools and compatability between tools.

Some embodiments of the APC system utilize load balancing across the multiple process components. Software packages including Orbit-Isis and Orbit-OTM address load balancing. Similarly, some embodiments of the APC system utilize programming packages, such as Orbit-OTS and Orbit-OTM, that improve robustness in a distributed object system.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A computer program product comprising:
    a computer usable medium having computable readable code embodied therein, the computable readable code including instructions that implement a process control software system capable of controlling a process having a plurality of devices communicating in a network, the devices including a metrology machine, a processing machine, and a controller, the process control software system including:
        a metrology machine plan routine capable of controlling operations of the metrology machine, the metrology machine plan routine capable of generating a human readable text describing activities to be exercised by the metrology machine and data to be collected and analyzed by the metrology machine;
        a processing machine plan routine capable of controlling operations of the processing machine, the processing machine plan routine capable of generating a human readable text describing activities to be exercised by the processing machine and data to be collected and analyzed by the processing machine; and
        a strategy routine controlling operations of the controller, the strategy routine capable of coordinating activities of the metrology machine plan and the processing machine plan that span multiple processing steps of the process.

2. A computer program product according to claim 1 wherein:
    the metrology machine is a pre-process metrology machine that measures a characteristic of a material prior to supplying the material to the processing machine, the pre-process metrology machine capable of generating a feed-forward measurement data that is communicated from the pre-process metrology machine to the controller; and
    the strategy routine utilizes the feed-forward measurement data as an input data to the controller, the strategy routine capable of determining a processing parameter based on the feed-forward measurement data that is applied to the processing machine and determines activities of the processing machine.

3. A computer program product according to claim 1 wherein:
    the metrology machine is a post-process metrology machine that measures a characteristic of a material subsequent to processing the material by the processing machine, the post-process metrology machine capable of generating a feed-back measurement data that is communicated from the post-process metrology machine to the controller; and the strategy routine utilizes the feed-back measurement data as an input data to the controller, the strategy routine capable of determining a processing parameter based on the feed-back measurement data that is applied to the processing machine and capable of determining activities of the processing machine.

4. A computer program product according to claim 1 wherein:

the process control software system includes software routines that are:
 distributed among the controller, the metrology machine, and the processing machine;
 object-oriented; and
 based on standards of Common Object Request Broker Architecture (CORBA), CORBA services, and CORBA facilities.

5. A computer program product according to claim 1 wherein:

the process devices further include a database;
the process control software system further includes a data store and a data history;
the metrology machine is a pre-process metrology machine that measures a characteristic of a material prior to supplying the material to the processing machine;
the metrology machine plan routine includes:
 a routine capable of directing the metrology machine to measure a material;
 a routine capable of receiving measurement data from the metrology machine;
 a routine capable of storing the measurement data in the data store for use in a processing step; and
 a routine capable of sending the measurement data to the data history.

6. A computer program product according to claim 1 wherein:

the process devices further include a database;
the process control software system further includes a data store and a data history;
the processing machine plan routine includes:
 a routine capable of retrieving a process model from the strategy;
 a routine capable of determining a processing parameter based on measurement data received from a metrology machine plan routine;
 a routine capable of sending the processing parameter to the processing machine and directing the processing machine to execute a processing activity;
 a routine capable of receiving a notification that the processing activity of the processing machine is complete; and
 a routine capable of sending determined parameters to the data history.

7. A computer program product according to claim 1 wherein:

the process devices further include a database;
the process control software system further includes a data store and a data history;
the metrology machine is a post-process metrology machine that measures a characteristic of a material subsequent to processing the material by the processing machine;
the metrology machine plan routine includes:
 a routine capable of directing the metrology machine to measure a material;
 a routine capable of receiving measurement data from the metrology machine;
 a routine capable of retrieving an old version of a process plan;
 a routine capable of executing a model update algorithm;
 a routine capable of storing the updated model in the data store for use in a processing step; and
 a routine capable of sending the updated model data to the data history.

8. A computer program product according to claim 1 wherein:

the devices include a plurality of processing equipment devices; and
the process control software system supports a run-to-run control scenario using model-based process control operating a plurality of the processing equipment devices, a result of material processing at a processing equipment device being passed on to a subsequent manufacturing step using feed-forward control and being used to influence future processing of the material.

9. A computer program product according to claim 1 wherein:

the devices include a plurality of processing equipment devices; and
the process control software system supports a fault detection and classification scenario using model-based detection and classification of problems occurring with a processing equipment device, data being collected from a processing equipment device being collected and analyzed using an idealized mathematical process model, a result of the analysis being used to detect an occurrence of a processing equipment device fault and to determine a type of the processing equipment device fault.

10. A computer program product according to claim 1 wherein:

the computer usable medium is a communication signal transmitted over a communication channel.

11. A computer program product comprising:

a computer usable medium having computable readable code embodied therein, the computable readable code including instructions that implement a process control software system capable of controlling a process having a controller and a plurality of processing equipment devices and metrology machine devices communicating in a network, the process control software system including:
 a plurality of process control framework components capable of controlling activities exercised by the processing equipment devices and controlling data collected and analyzed by the metrology machine devices; and
 the process control framework components being developed by an iterative process of a plurality of phases including analysis, design, implementation and deployment phases, the process control framework components being incrementally enhanced and having functionality increased in the plurality of phases.

12. A computer program product according to claim 11 wherein:

the process control framework components include a plan executor capable of controlling operations of a device such as the processing equipment devices and the metrology machine devices, the plan executor capable of generating a human readable text describing activities to be exercised by the device and data to be collected and analyzed by the device; and the process control framework components implement a strategy coordinating activities of the plurality of devices that span multiple processing steps of the process.

13. A computer program product according to claim 11 wherein:

the process control framework components are interoperable by a user using a user interface, the user performing coordinating activities for operating the plurality of devices.

14. A computer program product according to claim 11 wherein:

the process control framework components are substitutable by a user using a user interface, the process control framework components being replacable or upgradable.

15. A computer program product according to claim 11 wherein:

the process control framework components are extensible by a user using a user interface, the process control framework components having a functionality that is extended to perform additional activities and specialized for special activities.

16. A computer program product according to claim 11 wherein:

the process control framework components are software routines that are:
distributed among the plurality of devices;
object-oriented; and
based on standards of Common Object Request Broker Architecture (CORBA), CORBA services, and CORBA facilities.

17. A computer program product according to claim 11 wherein:

the devices include a plurality of processing equipment devices; and the process control software system supports a run-to-run control scenario using model-based process control operating a plurality of the processing equipment devices, a result of material processing at a processing equipment device being passed on to a subsequent manufacturing step using feed-forward control and being used to influence future processing of the material.

18. A computer program product according to claim 11 wherein:

the devices include a plurality of processing equipment devices; and the process control software system supports a fault detection and classification scenario using model-based detection and classification of problems occurring with a processing equipment device, data being collected from a processing equipment device being collected and analyzed using an idealized mathematical process model, a result of the analysis being used to detect an occurrence of a processing equipment device fault and to determine a type of the processing equipment device fault.

19. A computer program product according to claim 11 wherein:

the process control framework components include:
a plan execution component capable of controlling execution of advanced processing control strategies, plans, and process control scripts associated with the control strategies and plans, the plan execution component capable of interacting with other components of the process control framework components as dictated by the scripts to perform selected process control functionalities.

20. A computer program product according to claim 11 wherein:

the process control framework components include:
a fault detection monitoring component capable of supplying an information window into a current state and past states of processing equipment, information in the window including processing activity, alarms, and faults.

21. A computer program product according to claim 11 wherein:

the process control framework components include:
a machine interface component for interfacing between an equipment interface and a process control representation of a fab tool, and for translating between equipment interface communications and a Common Object Request Broker Architecture (CORBA).

22. A computer program product according to claim 11 wherein:

the process control framework components include:
a sensor interface component for interfacing of sensor data acquisition Plug-in applications.

23. A computer program product according to claim 11 wherein:

the process control framework components include:
an operator interface component for communicating between a wafer fab technician (WFT) and the process control system via a graphical user interface (GUI).

24. A computer program product according to claim 11 wherein:

the process control framework components include:
a Document Management component for executing version control operations for extended implementation by associated Document Management components including Data Collection Plan Management, Plug-in Management, and Plan Management.

25. A computer program product according to claim 11 wherein:

the process control framework components include:
a Data Collection Plan Management component for configuring and managing data collection plans, associated duration plans, sampling plans, and reporting plans.

26. A computer program product according to claim 11 wherein:

the process control framework components include:
a Plug-In Management component for defining, importing, and managing process control Plug-In applications that are developed with tools that are external to the process control system, such as Matlab, Mathematica, and MatrixX.

27. A computer program product according to claim 11 wherein:

the process control framework components include:
a Plan Management component for defining, configuring, managing, and defining usage of process control strategies, plans, and scripts.

28. A computer program product according to claim 11 wherein:
the process control framework components include:
a Sign-Off Management component for executing chance management, sign-off operations, and supporting other Document Management components.

29. A computer program product according to claim 11 wherein:
the process control framework components include:
a Data Store component for storing and retrieving process control models and process control status data.

30. A computer program product according to claim 11 wherein:
the process control framework components include:
a Data History component for storing an historical repository and archival of process control data for usage in off-line analysis.

31. A computer program product according to claim 11 wherein:
the process control framework components include:
a Component Management component for executing administrative services, configuration services, event services, and state services for servers developed for the process control framework.

32. A computer program product according to claim 11 wherein:
the process control framework components include:
a System Management component for defining, grouping, installing, and managing components in the process control system.

33. A computer program product according to claim 11 wherein:
the process control framework components include:
a Logger component for capturing activity and trace information for diagnostic and monitoring operations.

34. A computer program product according to claim 11 wherein:
the process control framework components include:
a Registry component for maintaining a centralized repository of component configuration information including setup values, system environment settings, and lists of dependent objects and event channels.

35. A computer program product according to claim 11 wherein:
the process control framework components include:
an Events component for handling asynchronous event signals including receiving event signals from event suppliers and sending, event signals to event consumers that are decoupled from the event suppliers, the Events component supporting event "fan-in" and notification "fan-out".

36. A computer program product according to claim 11 wherein:
the process control framework components include:
a Trader component for handling service-based lookup for components to find other components that perform a selected service.

37. A computer program product according to claim 11 wherein:
computer usable medium is a communication signal transmitted over a communication channel.

* * * * *